(12) United States Patent  
Vayanos et al.

(10) Patent No.: US 8,831,004 B2
(45) Date of Patent: Sep. 9, 2014

(54) DATA DELIVERY IN CONJUNCTION WITH A HYBRID AUTOMATIC RETRANSMISSION MECHANISM IN CDMA COMMUNICATION SYSTEMS

(75) Inventors: Alkinoos Hector Vayanos, San Diego, CA (US); Durga Prasad Malladi, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 12/117,493

(22) Filed: May 8, 2008

(65) Prior Publication Data

US 2008/0212541 A1    Sep. 4, 2008

Related U.S. Application Data

(60) Division of application No. 10/868,422, filed on Jun. 14, 2004, now Pat. No. 7,525,944, which is a continuation of application No. 10/176,353, filed on Jun. 19, 2002, now Pat. No. 6,901,063.

(60) Provisional application No. 60/380,408, filed on May 13, 2002.

(51) Int. Cl.
*H04L 12/28* (2006.01)
*H04L 1/18* (2006.01)

(52) U.S. Cl.
CPC ............ *H04L 1/1851* (2013.01); *H04L 1/1877* (2013.01); *H04L 1/1845* (2013.01)
USPC ..................................... 370/394; 370/395.42

(58) Field of Classification Search
USPC ................ 370/389, 352, 328, 394, 329, 335, 370/384–386, 410, 412, 413, 431, 432, 426, 370/441, 395.21, 392, 395.41
See application file for complete search history.

(56) References Cited

U.S. PATENT DOCUMENTS 5,231,633 A * 7/1993 Hluchyj et al. ............... 370/429
5,752,193 A * 5/1998 Scholefield et al. ....... 455/452.2
(Continued)

FOREIGN PATENT DOCUMENTS

CN    1205146 A    1/1999
CN    1221545      6/1999
(Continued)

OTHER PUBLICATIONS

International Search Report—PCT/US03/015201, International Search Authority—European Patent Office, Oct. 1, 2003.

(Continued)

*Primary Examiner* — Hanh N Nguyen
(74) *Attorney, Agent, or Firm* — Michelle S. Gallardo

(57) ABSTRACT

Techniques for delivering data recovered by a HARQ entity in proper order to higher layers in a CDMA system. In a method, packets are received from the HARQ entity by the re-ordering entity and missing packets among the received packets are detected. Packets may be transmitted in a sequential order based on transmission sequence numbers (TSNs) assigned to the packets, and missing packets may be detected based on the TSNs of the received packets. Delivery of received packets later than the missing packets are stalled because higher layers expect data in-order. A determination is thereafter made whether each missing packet is (1) subsequently received from the HARQ entity or (2) lost, by successively eliminating HARQ channels that may be used to send the missing packet. Received packets previously stalled by each missing packet are delivered after the missing packet is determined to be lost or received.

19 Claims, 21 Drawing Sheets

(56) References Cited

U.S. PATENT DOCUMENTS

| | | | |
|---|---|---|---|
| 5,754,754 A | | 5/1998 | Dudley et al. |
| 5,790,592 A | | 8/1998 | Baik |
| 5,828,677 A | | 10/1998 | Sayeed et al. |
| 6,308,294 B1 | | 10/2001 | Ghosh et al. |
| 6,314,541 B1 | | 11/2001 | Seytter et al. |
| 6,680,934 B1 | * | 1/2004 | Cain .............................. 370/352 |
| 6,697,347 B2 | | 2/2004 | Ostman et al. |
| 6,697,986 B2 | | 2/2004 | Kim et al. |
| 6,697,988 B2 | | 2/2004 | Kim et al. |
| 6,700,867 B2 | | 3/2004 | Classon et al. |
| 6,700,869 B1 | * | 3/2004 | Falco et al. ................... 370/230 |
| 6,850,540 B1 | * | 2/2005 | Peisa et al. .................... 370/468 |
| 6,901,063 B2 | | 5/2005 | Vayanos et al. |
| 6,901,603 B2 | | 5/2005 | Zeidler et al. |
| 6,961,349 B2 | * | 11/2005 | Malomsoky et al. ......... 370/469 |
| 6,987,780 B2 | | 1/2006 | Wei et al. |
| 7,054,316 B2 | * | 5/2006 | Cheng et al. .................. 370/394 |
| 7,082,459 B2 | | 7/2006 | Kim et al. |
| 7,185,257 B2 | | 2/2007 | Kim et al. |
| 7,236,494 B2 | | 6/2007 | Mallory |
| 7,298,730 B2 | | 11/2007 | Wu |
| 7,376,879 B2 | * | 5/2008 | Terry et al. .................... 714/751 |
| 7,525,944 B2 | | 4/2009 | Vayanos et al. |
| 2001/0016502 A1 | * | 8/2001 | Shirai ........................... 455/558 |
| 2001/0032325 A1 | | 10/2001 | Fong et al. |
| 2001/0055290 A1 | * | 12/2001 | Seidel et al. .................. 370/337 |
| 2002/0137521 A1 | | 9/2002 | Kim et al. |
| 2002/0172208 A1 | * | 11/2002 | Malkamaki ................... 370/400 |
| 2003/0039218 A1 | * | 2/2003 | Kwak ............................ 370/320 |
| 2003/0086391 A1 | * | 5/2003 | Terry et al. .................... 370/329 |
| 2003/0123403 A1 | * | 7/2003 | Jiang ............................. 370/328 |
| 2003/0125056 A1 | | 7/2003 | Jiang |
| 2004/0004954 A1 | * | 1/2004 | Terry et al. .................... 370/349 |

FOREIGN PATENT DOCUMENTS

| | | |
|---|---|---|
| JP | 8289367 A | 11/1996 |
| JP | 2001358699 A | 12/2001 |
| KR | 100537633 | 12/2005 |
| WO | WO0120874 | 3/2001 |
| WO | WO0162021 | 8/2001 |
| WO | WO0180579 | 10/2001 |
| WO | WO02087131 | 10/2002 |
| WO | 02096006 A2 | 11/2002 |
| WO | WO03105394 | 12/2003 |

OTHER PUBLICATIONS

"3rd Generation Partnership Project; Technical Specification Group Radio Access Network; MAC Protocol Specification (Release 5)" 3GPP TS 25.321 V5.2.0, 2002, pp. 47-51, XP002960551, Sep. 2002.

"3rd Generation Partnership Project; Technical Specification Group Radio Access Network; UTRA High Speed Downlink Packet Access (HSDPA); Overall Description; Stage 2 (Release 5)" 3GPP TS 25.308 V5.0.0, 2001, pp. 15-18, XP002960552, Sep. 2001.

International Preliminary Examination Report, PCT/US2003/015201—International Preliminary Examining Authority—US, Mar. 7, 2004.

European Search Report—EP10166941, Search Authority—Munich Patent Office, Nov. 3, 2010.

European Search Report—EP10166942, Search Authority—Munich Patent Office, Jul. 27, 2010.

Partial European Search Report—EP10166941, Search Authority—Munich Patent Office, Jul. 21, 2010.

Philips: "Interplay of retransmissions on RLC and MAC-hs level" 3GPP Draft; R2-030151 Interplay of Retransmissions on RLC and MAC-HS Level, 3rd Generation Partnership Project (3GPP), Mobile Competence Centre ; 650, Route Des Lucioles ; F-06921 Sophia-Antipolis Cedex : France. vol. RAN WG2 , no. Sophia Antipolis , France; Feb. 14, 2003, XP050122884 [ retrieved on Feb. 14, 2003].

Qualcomm: "Enhancements to Stall Avoidance mechanism" 3GPP Draft; R2-021590 Stall Avoidance Discussion, 3rd Generation Partnership Project (3GPP). Mobile Competence Centre : I I 650, Route Des Lucioles ; F-06921 Sophia-Antipolis Cedex : France. 1 vol . RAN WG2, No. Turin ;Italy ; Jun. 21, 2002, XP050121152.

QUALCOMM: "Flushing indication for stall avoidance" Documents Considered to Be Relevant 3GPP Draft; R2-022969 Flushing Indication, 3rd Generation Partnership Project (3GPP), Mobile Competence Centre ; 650, Route Des Lucioles ; F-06921 Sophia-Antipolis Cedex : France. vol. RAN WG2 , No. Sophia Antipolis , France; Nov. 8, 2002, XP050122465 [retrieved on Nov. 8, 2002].

ASUSTeK, Missing gap removal in the reordering entity, 3GPP TSG-RAN WG2#27 R2-020240, Feb. 2002, URL http://www.3gpp.org/ftp/tsg_ran/WG2_RL2/TSGR2_27/Docs/Zips/R2-020240.zip.

Qualcomm, Handling of missing blocks in the reordering buffer, 3GPP TSG RAN Joint WG1/WG2 AH#32 R2A-010029, Nov. 2001, URL: http://www.3gpp.org/ftp/tsg_ran/WG2_RL2/TSGR2_AHs/2001_11_WG1_HSDPA/R2_only_docs/R2A010029.zip.

Motorola, "HARQ Protocol: Details of Asynchronous/Synchronous HARQ Scheme, Discussion and decision, Agenda Item 9.2.2, Source: Motorola", 3GPP TSG-RAN WG1, TSGR2#23-011977, Aug. 27-31, 2001, Helsinki, Finland, URL:http://www.3gpp.org/ftp/tsg_ran/WG2_RL2/TSGR2_23/Docs/.

Philips, "Signalling requirements for N-channel S&W with error-recovery is HSDPA", 3GPP TSG-RAN WG2 TSGR2#24(01)2367, Oct. 2001, URL, http://www.3gpp.org/ftp/tsg_ran/WG2_RL2/TSGR2_24/Docs/Zips/R2-012364.zip (Abort indicator).

Philips, "Signalling requirements for N-channel S&W with error-recovery in HSDPA", TSGR2#24(01)2367, Oct. 22-26, 2001, <online> http://www.3gpp.org/FTP/tsg_ran/WG2_RL2/TSGR2_24/Docs/Zips/R2-012367.zip.

* cited by examiner

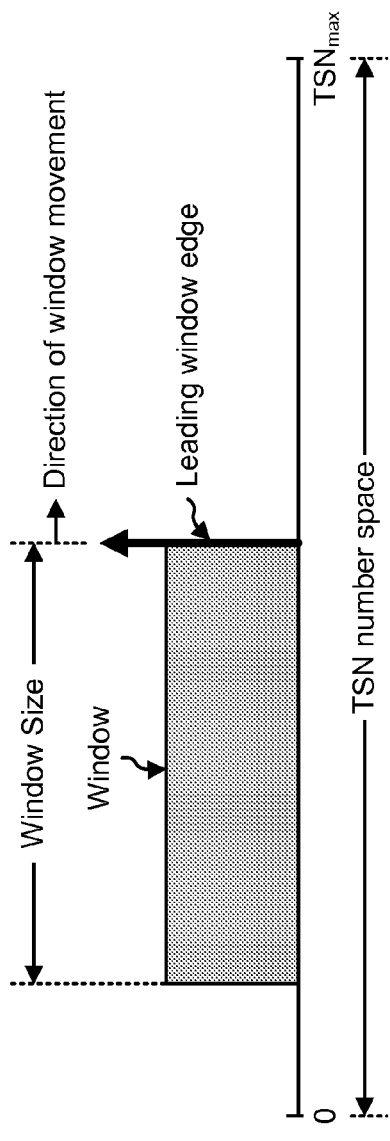
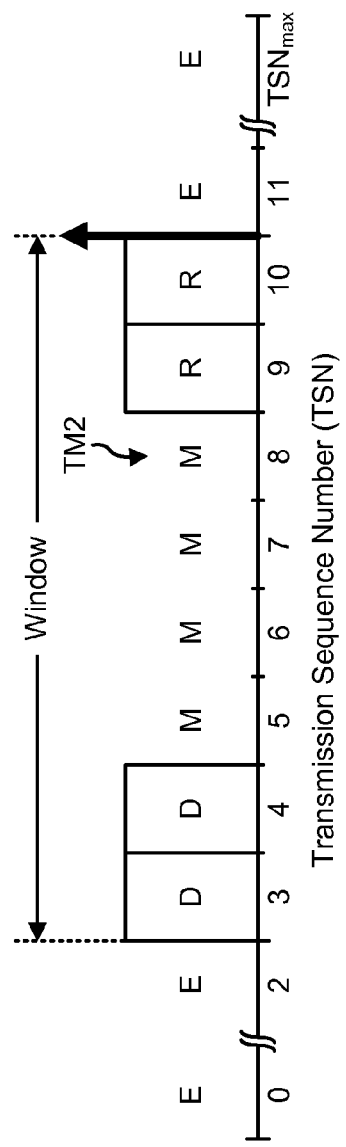
FIG. 6A
FIG. 6B

DATA DELIVERY IN CONJUNCTION WITH A HYBRID AUTOMATIC RETRANSMISSION MECHANISM IN CDMA COMMUNICATION SYSTEMS

CLAIM OF PRIORITY UNDER 35 U.S.C. §120

The present Application for patent is a Divisional and claims priority to patent application Ser. No. 10/868,422 entitled "Data Delivery in Conjunction with a Hybrid Automatic Retransmission Mechanism in CDMA Communication Systems" filed Jun. 14, 2004, which claims the benefit of U.S. Pat. No. 6,901,063 entitled "Improved Data Delivery in Conjunction with a Hybrid Automatic Retransmission Mechanism in CDMA Communication Systems" issued May 31, 2005, which claims the benefit of provisional U.S. Application Ser. No. 60/380,408, entitled "A Method and Apparatus for Stall Avoidance in a Communication System," filed May 13, 2002, and assigned to the assignee hereof and hereby expressly incorporated by reference herein.

BACKGROUND

1. Field

The present invention relates generally to data communication, and more specifically to techniques for improving the performance of data delivery to higher layers in conjunction with a hybrid automatic retransmission (HARQ) mechanism in CDMA communication systems.

2. Background

Wireless communication systems are widely deployed to provide various types of services such as voice, packet data, and so on. These systems may be multiple-access systems capable of supporting communication by multiple users, and may be based on code division multiple access (CDMA), time division multiple access (TDMA), frequency division multiple access (FDMA), or some other multiple access techniques. CDMA systems may provide certain advantages over other types of system, including increased system capacity.

To improve the reliability of data transmission, some newer-generation CDMA systems employ a hybrid automatic retransmission (HARQ) mechanism that can retransmit packets that have been incorrectly decoded by the receiver. For example, in W-CDMA Release 5, the HARQ is included in a Medium Access Control (MAC)-hs sublayer that resides on top of the physical layer. On the downlink, an HARQ entity at the transmitter processes data into packets that are assigned sequential transmission sequence numbers (TSNs). These packets may then be transmitted in sequential order based on their TSNs to the receiver.

At the receiver, a corresponding HARQ entity receives the packet transmissions and attempts to decode and recover each transmitted packet. However, due to degradation in the packet transmissions resulting from the radio link, some of the packets may not be decoded correctly (i.e., erased). When this occurs, a negative acknowledgment (NAK) is sent from the receiver back to the transmitter to initiate a retransmission of each erased packet.

The receiver HARQ entity is also tasked with providing the recovered packets (i.e., those decoded correctly) to higher layers. In W-CDMA, the higher layers expect data in the proper order, as determined by the TSNs of the packets. However, with the HARQ mechanism, packets may be recovered out-of-order by the receiver HARQ entity due to retransmissions. As a result, a re-ordering entity is used at the receiver to buffer and re-order the packets as they are recovered by the receiver HARQ. The re-ordering entity would then provide the packets in the proper order, as they become available, to higher layers.

If packets are recovered out of order by the receiver HARQ entity, then the re-ordering entity may "stall" or delay its delivery of the recovered packets to higher layers. In particular, the re-ordering entity would stall the delivery of data to higher layers whenever packets are detected to be missing, until either (1) the missing packets are recovered by the receiver HARQ or (2) the re-ordering entity is confident that the missing packets are lost and will not be recovered by the receiver HARQ. If the second condition is true, then another retransmission mechanism at higher layers may be relied upon to retransmit the lost data.

A challenge arises in determining the proper amount of time to wait by the re-ordering entity before declaring that the missing packets are lost and providing the already recovered packets to higher layers. One goal is to avoid stalling the delivery of data to higher layers, since waiting a long time or indefinitely for lost packets that will not be recovered is undesirable. A short wait time would be better for this goal. A conflicting goal is to minimize erroneous declarations of lost packets, so that unnecessary retransmissions with long delays by higher layers (if supported) or packet loss (if no retransmissions are performed by higher layers) are minimized. A long wait time would provide better assurance that the packets are indeed lost. This problem is commonly referred to in the art as "stall avoidance".

There is therefore a need in the art for techniques to improve the performance of stall avoidance in a CDMA system.

SUMMARY

Techniques are provided herein to mitigate the effects of missing packets and improve stall avoidance performance. In particular, these techniques may be used to more effectively deal with situations in which the delivery of data to higher layers is stalled because of missing payloads. These techniques make use of information available from the HARQ processes in order to better decide whether or not to deliver data to higher layers.

Various mechanisms are provided herein that may be used singly or in combination to improve stall avoidance performance. These mechanisms include (1) transmission of the priority of each packet on a control channel instead of with the packet, (2) maintenance of an inactivity timer for each HARQ channel, (3) transmission of a flushing indication to "flush" one or more HARQ channels, which may in turn result in data being flushed by the re-ordering entity to higher layers, (4) formation of a set of candidate HARQ channels for each missing packet, which are channels that may be used for the missing packet, (5) determination of whether or not a missing packet is lost based on activity or inactivity detected on the HARQ channels in the candidate set. These mechanisms are described in further detail below.

In an embodiment, a method is provided for delivering data recovered by an HARQ entity in proper order to higher layers in a CDMA communication system. In accordance with the method, packets are received from the HARQ entity by the re-ordering entity and missing packets among the received packets are detected. Packets may be transmitted in a sequential order based on transmission sequence numbers (TSNs) assigned to the packets, and missing packets may be detected based on the TSNs of the received packets. Delivery of received packets later than the missing packets is stalled because higher layers expect data in-order. A determination is thereafter made whether each missing packet is (1) subsequently received from the HARQ entity or (2) lost, by successively eliminating HARQ channels that may be used to send the missing packet. Received packets previously stalled by each missing packet are delivered after the missing packet is determined to be lost or received.

A set of candidate HARQ channels may be formed for each missing packet. The candidate set may include, for example, all HARQ channels that are active at (or a short time after) the time the packet is detected to be missing. A HARQ channel may be eliminated from the set if (1) it is inactive for a particular period of time, (2) a packet is recovered from the HARQ channel, (3) a new packet is detected to be sent on the HARQ channel, or (4) an indication to flush the HARQ channel is received. An inactivity timer may be used for each HARQ channel to determine whether or not the channel is inactive, and may be restarted whenever a packet transmission is received on the channel.

These techniques may be used for various CDMA systems such as a W-CDMA system that implements Release 5 or later.

Various aspects and embodiments of the invention are described in further detail below. The invention further provides methods, program codes, digital signal processors, receiver units, transmitter units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 6A and 6B are diagrams graphically illustrating a window maintained for a particular priority queue and a window maintained by the receiver re-ordering entity, respectively;

DETAILED DESCRIPTION

Figure 1:
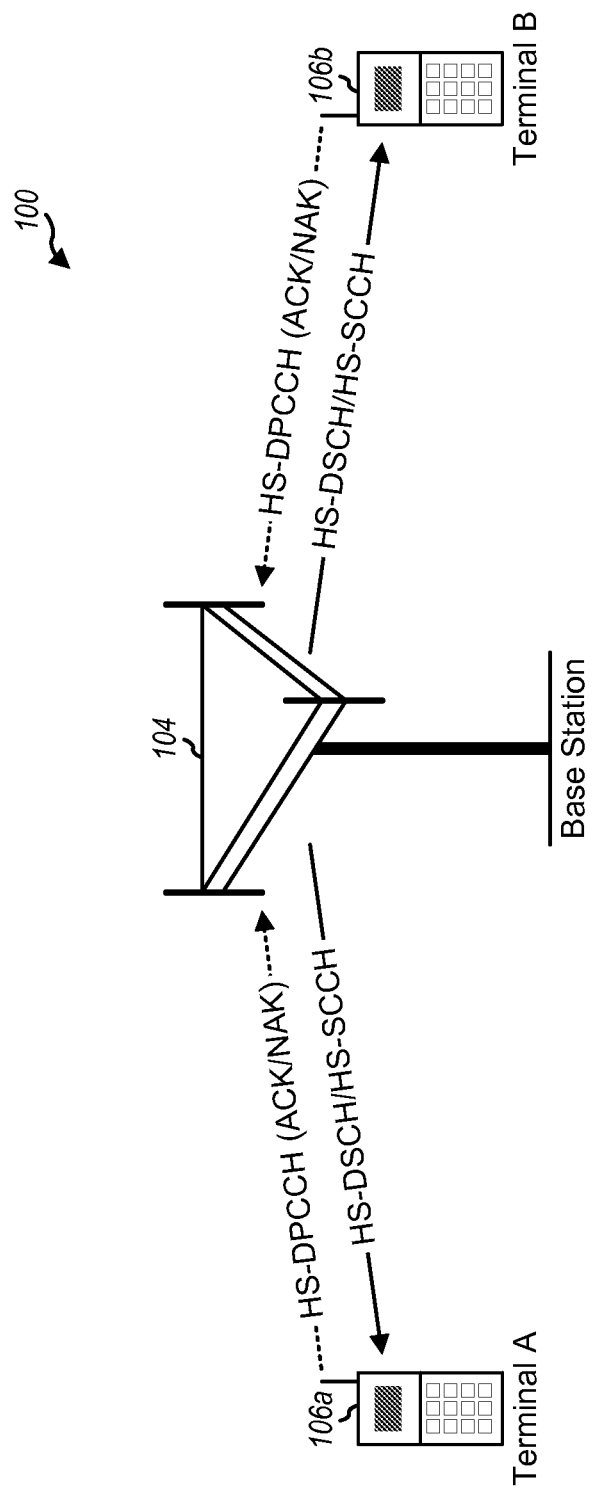
FIG. 1 is a diagram of a CDMA communication system.

FIG. 1 is a diagram of a CDMA communication system 100 that may implement the techniques described herein for improving stall avoidance. System 100 includes a number of base stations 104 that communicate with a number of terminals 106 (only one base station and two terminals are shown in FIG. 1 for simplicity). A base station is also referred to as a Node B, a base transceiver system (BTS), an access point, or some other terminology. The base stations may be part of a UMTS Radio Access Network (UTRAN). A base station and/or its coverage area are also often referred to as a cell, depending on the context in which the term is used.

A terminal is also referred to as a user equipment (UE), a mobile station, a remote station, an access terminal, or some other terminology. Each terminal may communicate with one or more base stations on the downlink and/or uplink at any given moment, depending on whether or not the terminal is active, whether or not soft handover is supported for the data transmission, and whether or not the terminal is in soft handover. The downlink (i.e., forward link) refers to transmission from the base station to the terminal, and the uplink (i.e., reverse link) refers to transmission from the terminal to the base station.

The techniques described herein for improving stall avoidance performance may be implemented in various CDMA communication systems. Thus, CDMA system 100 may implement one or more commonly known CDMA standards such as W-CDMA, cdma2000, IS-856, IS-95, and others. For clarity, various aspects, embodiments, and implementation details for improving stall avoidance performance are described below for a CDMA system that supports W-CDMA Release 5. Using W-CDMA terminology, the base station, terminal, and system controller are respectively referred to as Node B, UE, and RNC in the following description.

W-CDMA supports various types of services such as voice, packet data, and so on. In W-CDMA, data to be transmitted to a particular UE is processed as belonging to one or more transport channels. These transport channels are then mapped to one or more physical channels (at the physical layer) assigned to the UE. A physical channel is defined by various parameters (e.g., carrier frequency, scrambling code, channelization code(s), and so on).

W-CDMA Release 5 further supports high-speed downlink packet access (HSDPA), which is a set of transport/physical channels and procedures defined as part of the UTRAN that enable high-speed transmission of data on the downlink. For HSDPA, data is processed in blocks that are then multiplexed onto a high-speed downlink shared channel (HS-DSCH), which is a downlink transport channel. The HS-DSCH is then mapped to a high-speed physical downlink shared channel (HS-PDSCH) that may be shared by multiple UEs. For W-CDMA, each packet transmission on the HS-PDSCH spans a 2 msec time interval that is referred to as a transmission time interval (TTI).

The following transport and physical channels defined by W-CDMA are referred to herein:
DPCH—dedicated physical channel
HS-DSCH—high-speed downlink shared channel
HS-SCCH—shared control physical channel for the HS-DSCH
HS-PDSCH—high-speed physical downlink shared channel
HS-DPCCH—high-speed dedicated physical control channel (on the uplink)

The HS-PDSCH may be used to transmit data in a time and code division multiplexed (TDM/CDM) manner for multiple UEs. The control information for the HS-PDSCH, which includes various parameters used to properly receive the HS-PDSCH, is transmitted on an associated HS-SCCH. The HS-DPCCH is used to carry feedback from the UEs to report correctly and incorrectly received (i.e., erased) packets.

Figure 2:
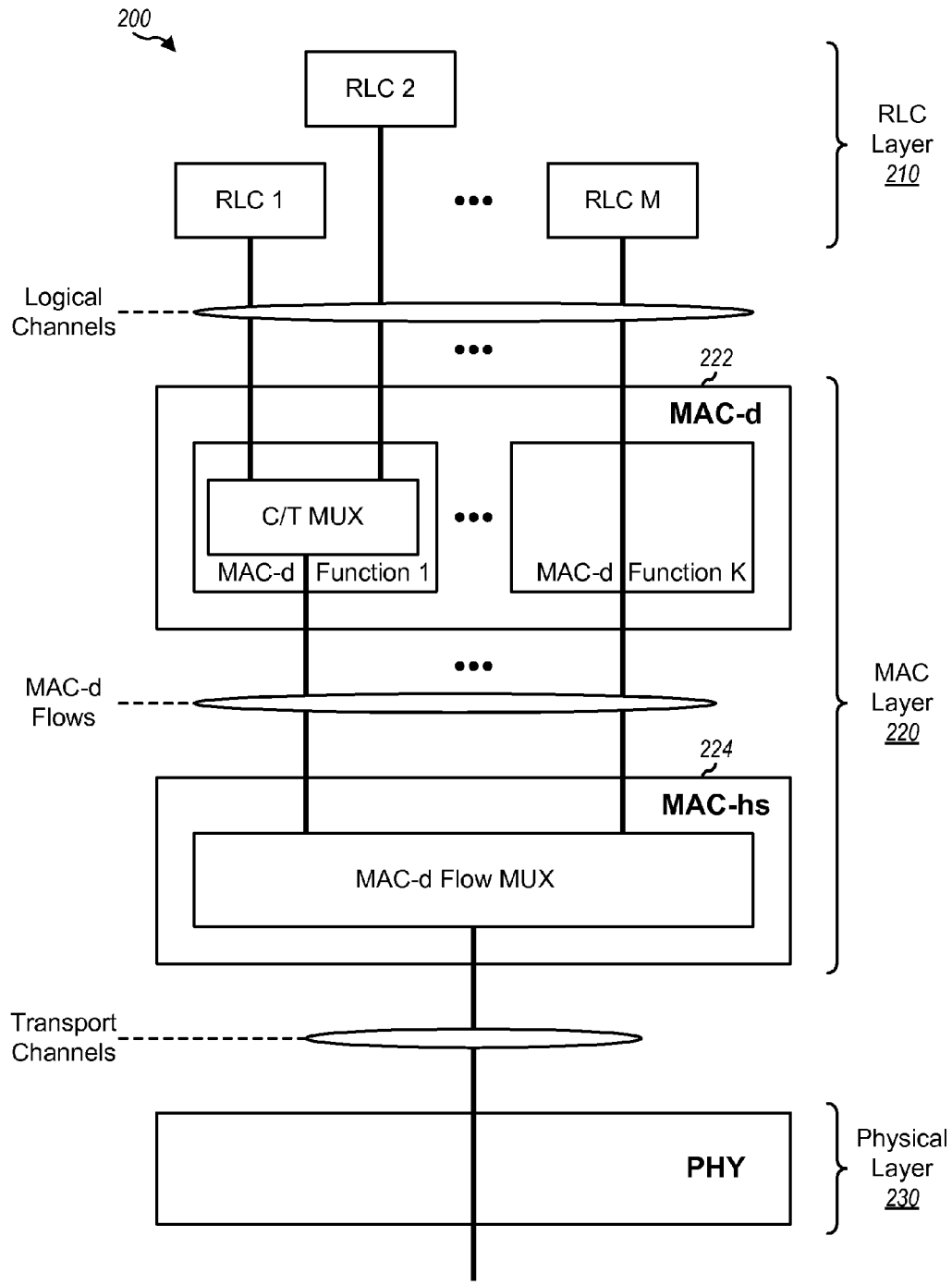
FIG. 2 is a diagram of a layer structure defined by W-CDMA Release 5.

FIG. 2 is a diagram of a layer structure 200 defined by W-CDMA Release 5. Layer structure 200 includes a Radio Link Control (RLC) layer 210, a Medium Access Control (MAC) layer 220, and a physical layer 230. The RLC layer performs automatic retransmission (ARQ) of data and typically resides at the Radio Network Controller (RNC). Retransmission via the RLC layer is typically associated with long delays because of the long round trip time between the RNC and UE. In the RLC layer, data is processed as belonging to logical channels.

For W-CDMA Release 5, the MAC layer is further partitioned onto a MAC-d sublayer 222 and a MAC-hs sublayer 224. The MAC-d sublayer performs a set of functions that includes (1) mapping logical channels to common and dedicated transport channels, (2) multiplexing one or more logical channels onto one transport channel (C/T MUX), (3) ciphering/deciphering, and so on. The MAC-d sublayer provides data flows to the MAC-hs sublayer, with each data flow being associated with certain scheduling attributes.

The MAC-hs sublayer performs specific functions related to HSDPA, as described below. The MAC-hs sublayer further provides the interface between the MAC-h sublayer and the physical layer.

The physical layer provides the mechanism for transmitting data for the MAC layer and signaling for higher layers.

These various layers and sublayers for W-CDMA are described in various standard documents, which are publicly available.

Figure 3:
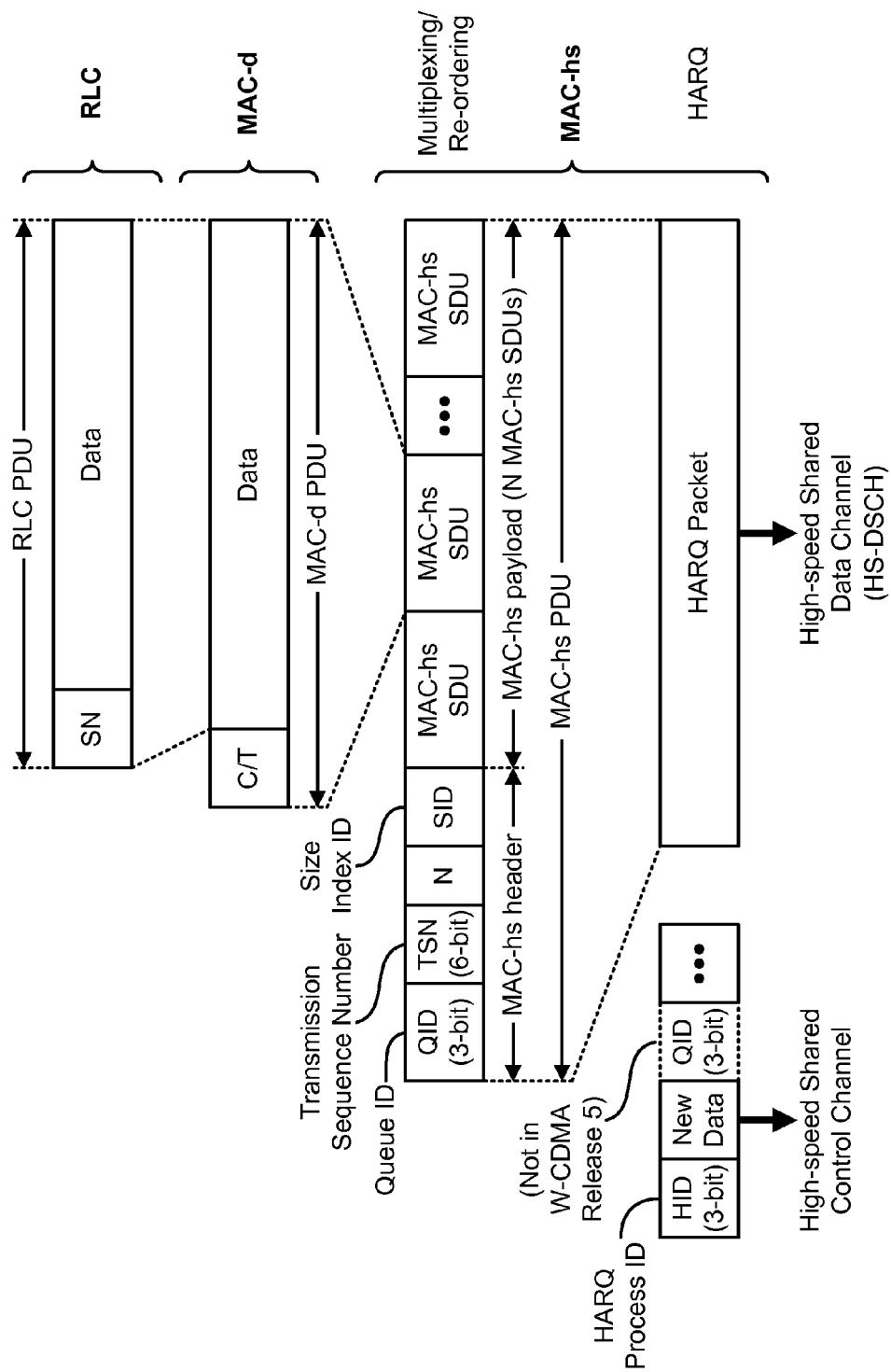
FIG. 3 is a diagram illustrating the data encapsulation performed by a Node B for transmission on the HS-DSCH for high-speed data packet access (HSDPA)

FIG. 3 is a diagram illustrating the data encapsulation performed by a Node B for transmission on the HS-DSCH. In W-CDMA, data to be transmitted on the downlink is provided by the RLC layer in RLC protocol data units (RLC PDUs), each of which includes a sequence number (SN) and data. The MAC-d sublayer receives the RLC PDUs for one or more logical channels and, for each RLC PDU, inserts a (C/T) field to form a corresponding MAC-d PDU. The C/T field identifies the logical channel associated with the RLC PDU.

The MAC-hs sublayer receives the MAC-d PDUs and forms MAC-hs PDUs. For W-CDMA Release 5, each MAC-d flow may include data for one or more logical channels at the RLC layer, and each MAC-d PDU may be associated with a particular priority. Since data is transmitted based on priority and available resources, data with different priorities is stored in different priority queues within the MAC-hs sublayer. Thereafter, data is retrieved from the proper priority queue, as needed, and further processed for transmission on the HS-DSCH.

To form a MAC-hs PDU, the MAC-hs sublayer first receives and serially concatenates one or more MAC-d PDUs from a particular priority queue to form the payload for the MAC-hs PDU. Padding bits may be added as necessary to fill out the payload. The MAC-hs sublayer then adds a header with the payload to form the MAC-hs PDU.

For W-CDMA Release 5, the MAC-hs header includes (1) a size index ID (SID) field indicative of the length of each MAC-d PDU in the MAC-hs PDU, (2) an N field indicative of the number of MAC-d PDUs included in the MAC-hs PDU, (3) a transmission sequence number (TSN) assigned to and used to uniquely identify the MAC-hs PDU, and (4) a Queue ID (QID) field indicative of the specific priority queue from which the MAC-d PDUs included in the MAC-hs PDU were retrieved. The TSN allows the UE to identify MAC-hs PDUs that have been recovered and is used to provide MAC-d PDUs in-order to the RLC layer, which expects data to be delivered to it in the correct sequence. A mechanism is also provided by W-CDMA to allow for the transmission of MAC-hs PDUs of different sizes within the same packet, but this is not described herein for simplicity.

MAC-hs PDUs are generated on the fly as they are needed. Each MAC-hs PDU is transmitted in a 2 msec TTI, which is the transmission unit on the HS-DSCH. For simplicity, a MAC-hs PDU is referred to herein as a "packet".

Control information is concurrently transmitted on the shared HS-SCCH along with each packet transmission. This control information includes (1) an HARQ process ID (HID), (2) a New Data indicator, (3) information identifying the specific UE to which the control information and the corresponding data transmission are intended, and (4) other information not described herein. The HID indicates the specific HARQ process used for the packet. Each packet may be transmitted and possibly retransmitted one or more times until (1) the UTRAN receives an ACK feedback on the HS-DPCCH for the packet, or (2) the transmitter decides to abandon the transmission of the packet. Each packet is associated with a specific HARQ process, which is an instance of a stop and wait (SAW) protocol used to control the transmission/retransmission of that packet. Since three bits are defined for the HID, up to eight packet transactions may be pending at any given moment. The eight HARQ processes may thus be viewed as eight "HARQ channels" that may be used to transmit packets, with each HARQ channel being associated with and identified by a specific HID value.

The New Data indicator is used to indicate the transmission of a new packet on a particular HARQ channel. To improve decoding performance, the UE typically (soft) combines all received transmissions for the same packet prior to decoding. The New Data indicator informs the UE that the current transmission is for a new packet and that all prior received transmissions for the same HARQ channel (which are for a prior packet) should be purged. The New Data indicator is a single bit value that toggles between "0" and "1" for consecutive packets transmitted on the same HARQ channel, and is effectively a 1-bit sequence number for the packets transmitted on the HARQ channel. The UE can thus detect a new packet by observing the New Data indicator toggles. The New Data indicator is also referred to herein as the "color" bit.

Figure 4A:
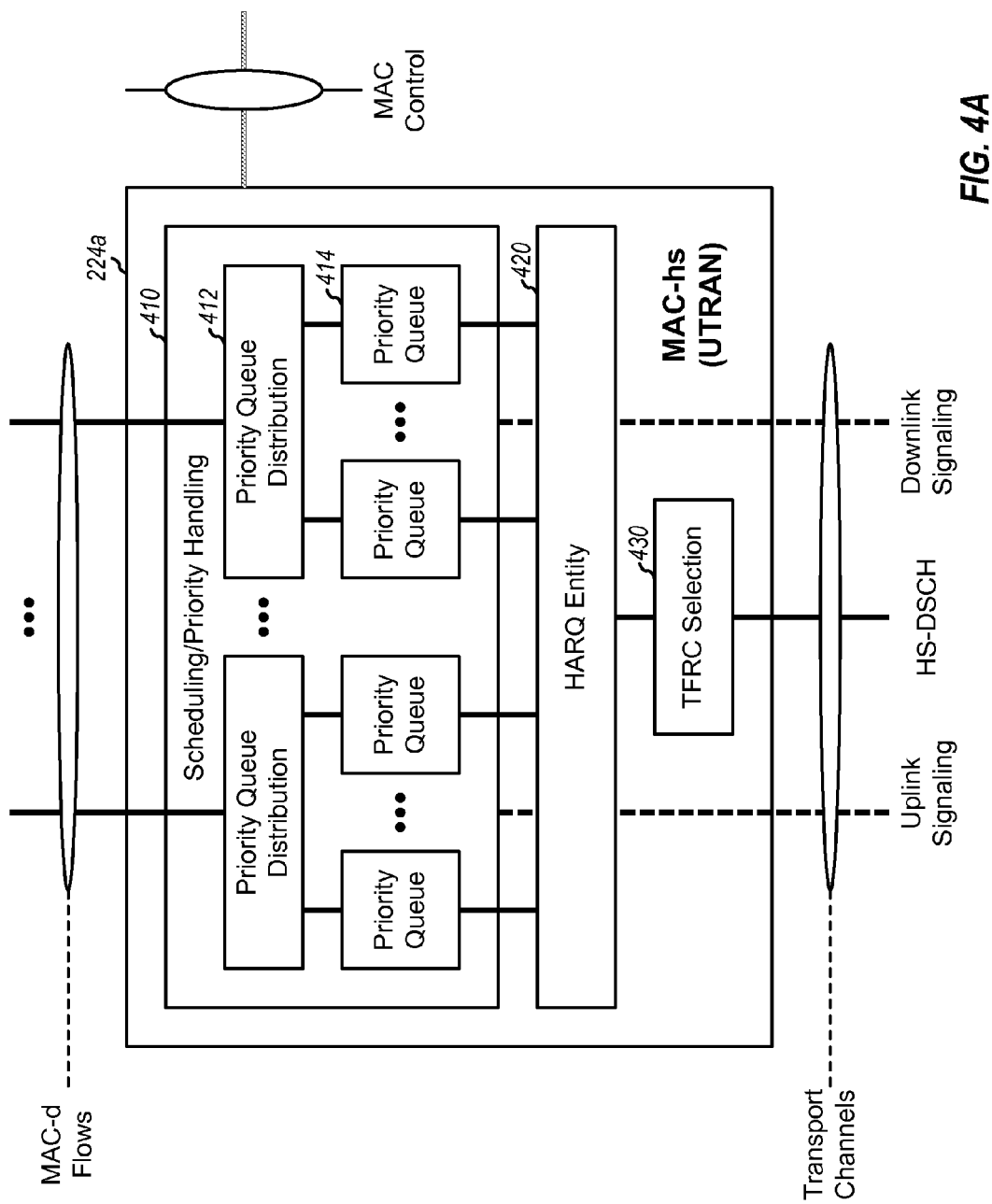
FIGS. 4A and 4B are diagrams of a MAC-hs entity defined by W-CDMA Release 5 for the UTRAN side and the UE side, respectively.

FIG. 4A is a diagram of a MAC-hs entity 224a defined by W-CDMA Release 5 for the UTRAN side. There is one MAC-hs entity in the UTRAN for each cell that supports HS-DSCH transmission. The MAC-hs entity handles data transmitted on the HS-DSCH and further manages physical resources allocation for HSDPA.

The UTRAN MAC-hs entity includes a scheduling/priority handling entity 410, an HARQ entity 420, and a TFRC entity 430. The scheduling/priority handling entity manages the data flows from the MAC-d entity according to their priorities, determines the TSN and priority queue for each packet being processed, and determines the transmission/retransmission of packets. The data flows from the MAC-d entity may include data with different priorities, which would then be placed in different priority queues. Data would thereafter be retrieved from the proper priority queue, based on priority and resource availability, and further processed for transmission/retransmission on the HS-DSCH.

One HARQ entity is provided to handle HARQ functionality for each UE. The HARQ entity performs transmission and (if necessary) retransmissions of packets to ensure reliable delivery of these packets to the UE. Retransmissions of packets are performed based on feedback from the UE. This feedback is in the form of an acknowledgment (ACK) to indicate successful decoding of a packet or a negative acknowledgment (NAK) to indicate an unsuccessful decoding of the packet.

The TFRC entity selects the appropriate transport format and resources for the data to be transmitted on the HS-DSCH.

Figure 4B:
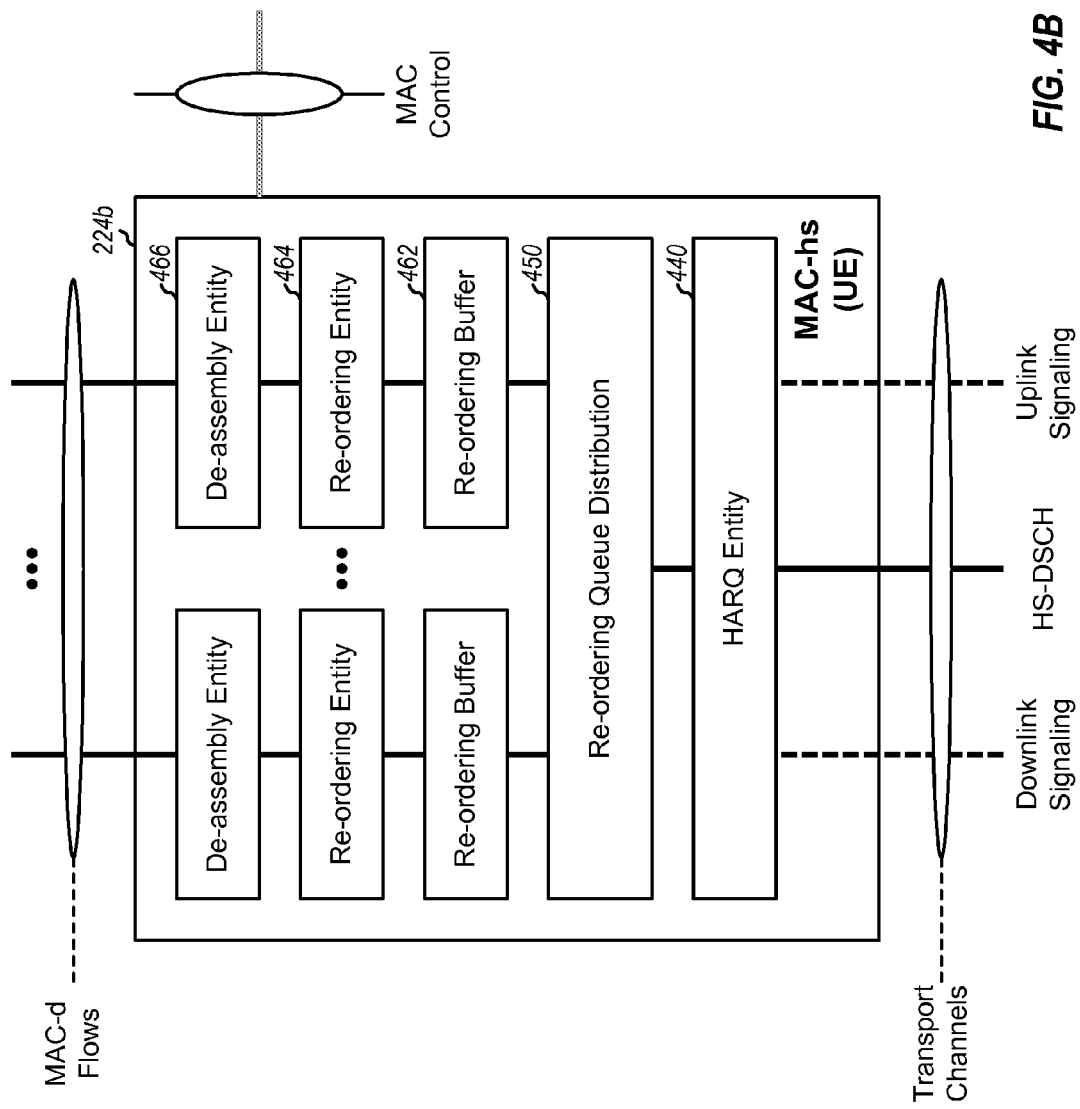

FIG. 4B is a diagram of a MAC-hs entity 224b defined by W-CDMA Release 5 for the UE side. The MAC-hs entity handles HSDPA specific function and includes an HARQ entity 440, a re-ordering queue distribution entity 450, and one set of re-ordering buffer 462, re-ordering entity 464, and de-assembly entity 466 for each Queue ID configured at the UE. One re-ordering buffer is thus provided for and is associated with each priority queue used for the UE.

The UE HARQ entity handles all tasks required for HARQ (e.g., generates the required ACK/NAK for each received packet transmission). The re-ordering queue distribution entity provides recovered packets to the proper re-ordering buffer based on the Queue ID sent for the packet.

The reordering entity for each re-ordering buffer reorders the recovered packets in the buffer according to the TSN assigned to each packet. Each priority queue is associated with its own sequence of TSNs. The reordering entity then provides packets with consecutive TSNs, as they are recovered, to the de-assembly entity. The packets are not delivered to the de-assembly entity (i.e., "stalled") if packets with lower TSNs are missing.

The de-assembly entity associated with each re-ordering buffer de-assembles the packets provided to it. The de-assembly is performed by removing the header in each packet to obtain the MAC-hs payload (see FIG. 3), extracting the MAC-d PDUs included the MAC-hs payload, and discarding padding bits (if any). The de-assembly entity then provides the MAC-d PDUs to higher layers via the MAC-d sublayer.

W-CDMA Release 5 allows for a number of re-ordering entities and a number of HARQ processes (or HARQ channels) to be operating concurrently. Each re-ordering entity processes data for one specific priority queue and employs one re-ordering buffer for this task. There is thus a one-to-one correspondence between re-ordering entity, priority queue, and re-ordering buffer. The HARQ channels are standard stop and wait entities, and each HARQ channel can carry data meant for any of the priority queues (or re-ordering buffers).

Figure 5:
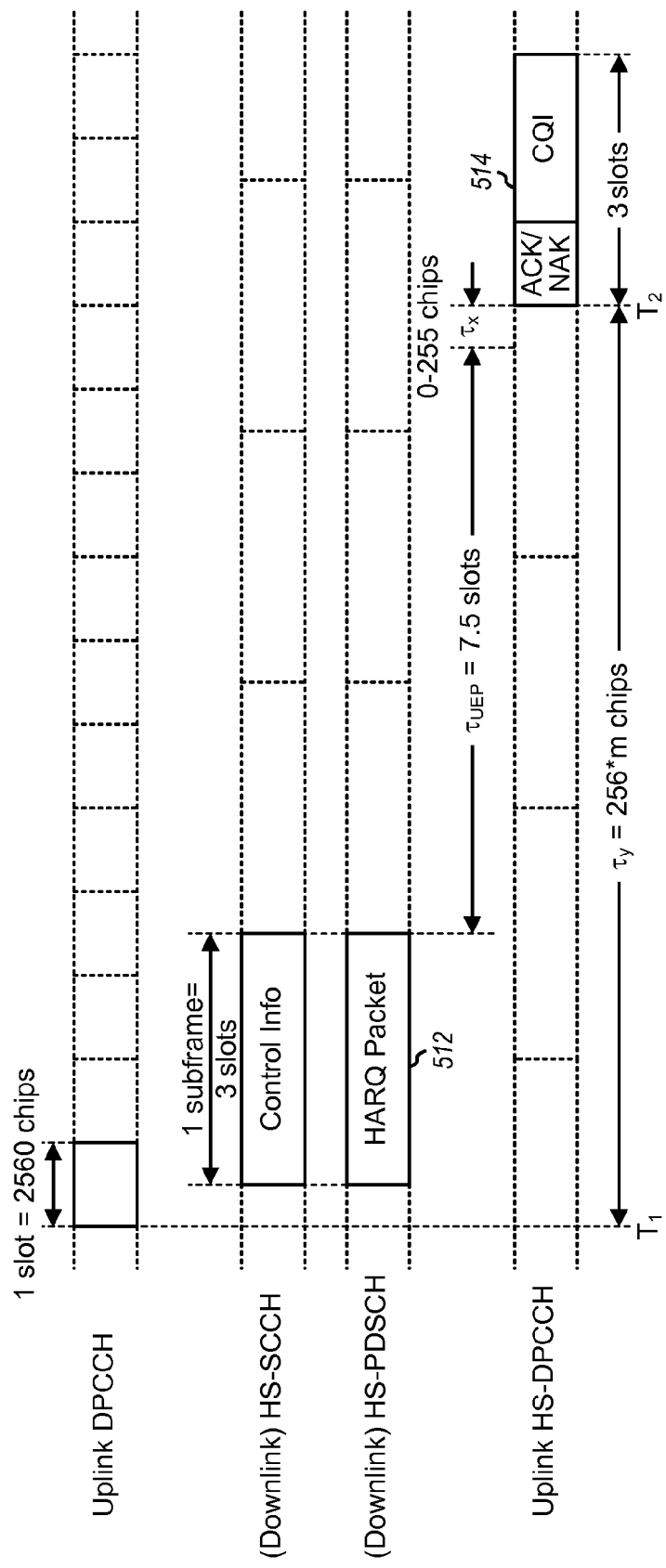
FIG. 5 is a diagram illustrating the timing relationship between various downlink and uplink physical channels used to implement HSDPA.

FIG. 5 is a diagram illustrating the timing relationship between various downlink and uplink physical channels used to implement HSDPA. The timing relationship shown in FIG. 5 is for a specific UE designated to receive HSDPA transmission.

The uplink DPCCH is used by the UE to send signaling for the uplink DPCH. The timing of the uplink DPCCH is used as a reference, and the timing for the other physical channels is provided relative to that of the uplink DPCCH.

As shown in FIG. 5, a packet is transmitted to the UE in subframe 512 on the HS-DPSCH. Each subframe spans one 2-msec slot. The start of subframe 512 occurs some amount of time after time T1, which is the start of a slot on the uplink DPCCH. The packet is transmitted to the designated UE, which receives and attempts to recover the packet. Based on the outcome of the decoding process, the UE reports back one of the following: (1) an ACK to indicate that the packet has been received correctly, (2) a NAK to indicate that the packet has been received in error (i.e., erased), or (3) nothing (i.e., a discontinuous transmission (DTX) bit) if it failed to detect (missed) the corresponding HS-SCCH. This feedback information is transmitted from the UE in a designated subframe 514 on the uplink HS-DPCCH. Subframe 514 starts at time T2, which is defined to be 7.5 slots plus a delay of $\tau_x$ (which is a value between 0 to 255 chips) from the end of the corresponding subframe 512. The delay $\tau_x$ is defined such that the elapsed time, $\tau_y$, between the start of the slot on the uplink DPCCH (T1) and the start of subframe 514 on the uplink HS-DPCCH (T2) is 256×m, where m is an integer.

The HSDPA design assumptions for the transmission of control information on downlink HS-SCCH and the uplink HS-DPCCH are as follows:

HS-SCCH (Downlink)
Probability {Miss HS-SCCH}≤$10^{-2}$
Probability {False alarm}≤$10^{-4}$
HS-DPCCH (Uplink)
Probability {ACK→NAK}≤$10^{-2}$
Probability {NAK→ACK}≤$10^{-4}$
Probability {DTX→ACK}≤$10^{-2}$ The above states that for the HS-SCCH on the downlink (1) the probability of missing a control message accompanying a packet transaction needs to be less than or equal to $10^{-2}$ and (2) the probability of mis-detecting a control message sent to another UE as one being sent to the UE needs to be less than or equal to $10^{-4}$. For the HS-DPCCH on the uplink (1) the probability of an ACK transmitted by the UE being received as a NAK by the Node B needs to be less than or equal to $10^{-2}$ (2) the probability of a NAK transmitted by the UE being received as an ACK by the Node B needs to be less than or equal to $10^{-4}$, and (3) the probability of a DTX bit transmitted by the UE being received as an ACK by the Node B needs to be less than or equal to $10^{-2}$.

In some channel conditions, especially in cases where the serving Node B for a particular UE is not the one with the best uplink (which may occur often since handing off from one Node B to another is slow for HSDPA), it may be difficult to achieve the ACK/NAK probability of error noted above.

A NAK to ACK error for a given packet results in the transmitter assuming that the packet has been correctly recovered by the receiver. The transmitter can then discard this packet and initiate the transmission of another packet on the same HARQ channel. Therefore, the NAK to ACK error results in a lost packet at the MAC layer. A higher probability of NAK to ACK error corresponds to higher occurrence of missing packets at the MAC layer. This in turn leads to higher probability of stalling by the re-ordering entity and more retransmissions required at the RLC layer.

The MAC layer needs to guarantee delivery of data in-order to higher layers. Since the HARQ mechanism using multiple HARQ channels may result in data being recovered out of sequence by the UE, a re-ordering sublayer was added in the MAC layer in W-CDMA Release 5. The re-ordering sublayer buffers packets as they are recovered, re-orders these packets, and delivers consecutive packets (as determined by their TSNs) to higher layers. If the re-ordering sublayer detects missing packets, based on gaps or holes in the TSNs of the recovered packets, then it holds off on (i.e., stalls) the delivery of all packets with TSNs later than the TSN of the earliest missing packet. When the missing packets are finally recovered, the re-ordering sublayer would then provide these newly recovered packets as well as any prior recovered packets that have been stalled.

Three "stall avoidance" mechanisms are provided by W-CDMA Release 5 to allow for practical implementations and to avoid situations where the re-ordering entity waits indefinitely for data that is not retransmitted. These stall avoidance mechanisms include:
Window-based scheme
Timer-based scheme
HARQ activity scheme
Each of these schemes is briefly described below.

Window-Based Scheme

Since each packet is tagged with a specific TSN, the recovered packets may be assembled in the proper sequence at the UE. Although the packets may be initially transmitted in sequential order by the Node B, these packets may be recovered out of order because a variable number of retransmissions may be required for each packet.

FIG. 6A is a diagram graphically illustrating the window maintained for a particular priority queue. The data for this priority queue is transmitted in packets that are identified by a 6-bit TSN. The TSN number space is $2^6=64$ (i.e., from 0 through 63). To resolve ambiguity in the TSN number space caused by the fact that the TSN field has a finite size, the receiver may use a window. The size of this window is typically set at less than half of the TSN number space (i.e., <32) and may be set as small as 8 to 16. Since the window size is smaller than the TSN number space, the order of the packets within the window is unambiguous. In determining the size of the window, there is a tradeoff. If the window is small, the stall avoidance performance at the receiver increases and the receiver buffer size requirement is reduced. However, the stall probability at the transmitter or the probability of needing to interrupt retransmissions (depending on the transmission strategy) is increased.

The window is advanced forward as new packets are received. For the receiver, the leading edge of the window may be set equal to the "latest" TSN of all recovered packets. Packets toward the left of the window have successively "earlier" TSNs. Since the TSN value can wrap around, the latest TSN value may actually be smaller than an earlier TSN whenever the TSN wraps around. Missing packets with TSNs earlier than the trailing edge of the window may be assumed to be lost (i.e., not retransmitted). Thus, as the window is advanced forward, packets earlier than the trailing window edge are "flushed" and sent to higher layers.

This window mechanism may therefore be used by the transmitter to flush out missing packets at the receiver. However, since the size of the window would need to be large to allow for a large number of retransmissions, a large amount of data would be needed to flush out the missing packets. Consequently, the window-based scheme is marginally effective at the end of data bursts, which are frequent in the case of bursty closed loop traffic such as what is generated by browsing.

Timer-Based Scheme

In order to address the limitations of the window-based scheme, a timer-based mechanism was also introduced in W-CDMA Release 5. For the timer-based scheme, each time a missing packet stalls the delivery of packets to higher layers at the receiver, a "long" timer is started. If no other missing packets are thereafter detected then, once the long timer expires, the missing packet is assumed to have been recovered, and all packets stalled by this missing packet are then delivered to higher layers. This mechanism requires the maintenance of one long timer per re-ordering queue (or a maximum of eight long timers for the eight re-ordering queues defined in W-CDMA Release 5).

To ensure proper HARQ operation, the long timer needs to be set longer than the longest amount of time it takes to complete all retransmissions for a given packet. A large number of retransmissions may need to be performed to recover the missing packet. Moreover, in a system that asynchronously schedules retransmissions and where the amount of resources (e.g., as quantified by channelization codes and transmit power) available for HSDPA can change dynamically, the amount of time it takes to complete all retransmissions for a missing packet can vary widely. Consequently, the value of this timer would need to be long. Otherwise, the retransmissions for the missing packet may be prematurely terminated by the expiration of the timer, in which case the missing packet would need to be retransmitted by higher layers, which is highly undesirable. The re-ordering entity may need to wait a significant amount of time for the long timer to expire or until all the retransmissions for the missing payload are completed.

In addition to the large value for the long timer, if several packets within the window are detected as missing, then the timers for these missing packets are effectively cascaded (i.e., the long timer is restarted whenever a new missing packet is detected). This may result in even longer delays in delivering the missing payloads to higher layers (with the longest possible delay being two times the value of the long timer in the worse case).

HARQ Activity Scheme

The third scheme to avoid stalling the delivery of recovered packets to higher layers is to detect activity on the HARQ channels. When no packets are expected on any of the HARQ channels (i.e., all of the previous packet transactions are completed), then the data in all re-ordering queues can be delivered by the re-ordering entities to higher layers. This mechanism has a few shortcomings. First, this scheme requires that no packet transaction is pending on any of the HARQ channels in order to be able to flush the packets to higher layers. Second, the receiver "marks off" a HARQ channel only if the packet transaction on that channel is completed. Since the receiver may wait indefinitely for a packet to be recovered on a given HARQ channel (e.g., if the transmitter abandons the packet transaction), the re-ordering queues may never be flushed. Third, if a control message is missed (i.e., not detected by the receiver), then it is possible that the packet associated with this control message will be discarded by the re-ordering entity, if it is subsequently recovered. This would be the case if another packet with a later TSN is recovered and provided to the re-ordering entity before the packet with the missed control message is retransmitted and the control channel is successfully decoded.

Techniques are provided herein to mitigate the effects of missing packets and improve stall avoidance performance. In particular, these techniques may be used to more effectively deal with situations in which the delivery of data by the MAC-hs sublayer to higher layers is stalled because of missing payloads. These techniques make use of information available from the HARQ processes in order to better decide whether or not to deliver data to higher layers.

The following mechanisms may be used to improve stall avoidance performance:

Transmission of the Queue ID on the HS-SCCH instead of with the payload.

Maintenance of an inactivity timer for each HARQ channel.

Transmission of a flushing indication to "flush" one or more HARQ channels, which may in turn result in data being flushed by the re-ordering entity to higher layers.

Formation of a set of candidate HARQ channels for each missing packet, which are channels that may be used to send the missing packet. A delay timer may be used for the candidate set formation.

Detection of activity on the HARQ channels to determine whether or not missing packets are lost.

Each of these mechanisms is described in further detail below.

The following terminology is used in the following description:

Packet transaction—a transmission and zero or more retransmissions of a particular packet on a particular HARQ channel.

Pending transaction—a packet transaction in which one or more additional retransmissions are expected for the packet.

Completed transaction—a packet transaction in which no additional retransmissions are expected for the packet.

Missing packet—a packet that is not recovered by the receiver and has a TSN earlier than that of another packet that has been recovered (a missing packet may still be in the process of being retransmitted or may have been discarded by the transmitter).

Recovered packet—a packet decoded correctly by the receiver.

Received packet—this term has two meanings depending on which entity is referred to. For the HARQ entity: a packet transmission received on a particular HARQ channel, which may or may not be decoded correctly. For the re-ordering entity: a recovered packet that is received from the HARQ entity but not yet delivered to the upper layers.

Active HARQ channel—a HARQ channel in which the packet transaction is pending and the next transmission received on the channel should be for a retransmission of the current packet.

Inactive HARQ channel—a HARQ channel in which the packet transaction is completed and the next transmission received on the channel should be for a new packet Candidate HARQ channel—a HARQ channel that may be used to send a packet detected to be missing.

Transmission of Queue ID on the Control Channel

In W-CDMA Release 5, the Queue ID that identifies the specific priority queue for a packet is transmitted as part of the header for that packet (see FIG. 3). Therefore, the priority queue to which the packet payload belongs can only be ascertained after the packet has been recovered. As a consequence, it is not possible to determine the priority queue associated with each missing packet since the packet has not been recovered.

If a packet is missing and the priority queue to which it belongs cannot be ascertained, then data delivery may be stalled for all re-ordering entities. This can degrade performance.

In an aspect, the priority queue for each packet is sent on the control message along with the packet transmission. A Queue ID field may be included in the control message, as shown by the dashed box in FIG. 3. By transmitting the Queue ID on the control channel, it would be possible to identify the priority queue for each packet for which the associated control message is correctly detected by the receiver, regardless of whether the packet itself is decoded correctly or in error. The information identifying the priority queue for each such packet may be used in conjunction with other mechanisms described below to further improve stall avoidance performance. For example, when used in conjunction with a mechanism described below, by identifying the priority queues for each such packet, it is possible to determine the priority queues that may be flushed to higher layers. This way, each such packet only affects the re-ordering entity associated with the priority queue for that packet and not the other re-ordering entities. Stall avoidance performance may therefore be improved.

Inactivity Timer for HARQ Channel

Each HARQ channel may be used to transmit one packet at any given moment. The packet is transmitted and possibly retransmitted one or more times on the HARQ channel until either (1) the transmitter receives an ACK for the packet or (2) the transmitter gives up on the transmission of the packet. In either case, the transmitter may thereafter send a new packet on the same HARQ channel and would indicate this by flipping the New Data indicator.

At the receiver, the packet transaction on a particular HARQ channel is deemed pending until (1) the packet is recovered correctly from the HARQ channel by the receiver, or (2) the receiver detects the transmission of a new packet on the HARQ channel (based on the New Data indicator in the control channel), since the transmitter would not send the new packet unless it decides to stop the transmissions of the prior packet.

At the receiver, new data will "flush" the pending data in the receiver window, which may have been discarded by the transmitter for one reason or other. For example, if there is no more data to be sent for priority queue A but there is still new data to be sent for priority queue B, then the data for priority queue B may be sent on the same HARQ channels previously used for priority queue A. In this case, the data for priority queue B would effectively "over-write" the data for priority queue A. The toggling of the New Data indicator for each HARQ channel allows the receiver to ascertain when the prior packet is being discarded by the transmitter.

However, if there is no more data to transmit, then there may be no activity on any of the HARQ channels. Without new activity, it is not possible for the UE to ascertain whether a given packet has been discarded by the network or that a retransmission for the packet is forthcoming. For each HARQ channel that is waiting for a packet that has been discarded by the transmitter and for which no new packet has been sent, the re-ordering entity associated with this HARQ channel will have to wait until the long timer maintained for the re-ordering queue elapses before it can deliver the available data to higher layers. The HARQ process will itself wait indefinitely for the transmission of a new packet or a retransmission of the current packet on the HARQ channel.

In another aspect, an "inactivity" timer may be maintained for each active HARQ channel to avoid the situation whereby the HARQ entity waits indefinitely for a retransmission of a packet that has been discarded by the transmitter. In an embodiment, the inactivity timer monitors activity on HARQ channel based on control messages received on the control channel for that HARQ channel. In one implementation, each time a new control message is received on the control channel for a particular active HARQ channel, the inactivity timer for that channel is restarted. If the inactivity timer elapses before another new control message is received for the HARQ channel, then the channel is deemed to be inactive.

A major advantage of using an inactivity timer for each HARQ channel is that it does not need to be as long as the long timer used for each re-ordering buffer. This is because the inactivity timer only needs to cover the maximum amount of time expected to take to receive a control message for an active HARQ channel (or two control messages, just in case the first one was missed). Since the probability of miss for the control channel is in the order of $10^{-2}$, the probability of missing two control channel transmissions in a row would be in the order of $10^{-4}$. Therefore, if the timer is set to the maximum time needed to perform two retransmissions, then the probability of erroneously discarding a packet still being transmitted would be approximately the same as the desired probability of NAK to ACK error, which is desirable since the two have essentially the same effect. In contrast, the long timer needs to be long enough to handle the maximum number of retransmissions for a missing packet (and not just two control message transmissions).

A local variable CurrNewData may be maintained for each HARQ channel and set to the New Data indicator received in the most recent transmission on the channel. If the HARQ channel is deemed to be inactive, then the next transmission on the channel is expected to be for a new packet, in which case the New Data indicator for this transmission will be different from the CurrNewData value. However, if the New Data indicator for the new transmission is the same as the CurrNewData value, then it may be assumed that the same packet is being sent (e.g., due to an ACK to NAK error), in which case the transmission may be discarded and an ACK may be sent back to the transmitter.

Flushing Indication for HARQ Channels

In yet another aspect, a flushing indication may be transmitted on the control channel and used to direct the HARQ entity at the UE to flush one or more HARQ channels. A flushed HARQ channel denotes that the pending transaction on the channel is completed. The re-ordering entity waiting on this HARQ channel may then perform the appropriate actions based on this information, as described below.

Various flushing indication may be sent to the UE in various manners. For example, the flushing indication may be sent in a control message using a reserved value in a field used to indicate code set or a field used to indicate transport block size.

If the UE receives a flushing indication, it would not attempt to decode a packet. The reason for this is described below. Each flushed HARQ channel may then be put in an Inactive state to indicate that no additional retransmissions are expected to be received on the channel.

One or more HARQ channels may be flushed based on a single flushing indication. In a first embodiment, the flushing indication only flushes the specific HARQ channel for which it is sent, which may be identified by the HID field in the control message. For this embodiment, multiple flushing indications may be sent if multiple HARQ channels are to be flushed. In a second embodiment, the flushing indication flushes all HARQ channels. This embodiment reduces the number of transmissions for flushing indications. However, the applicability of the flushing indication would also be reduced to the case where no data needs to be sent on any of the HARQ channels for any of the re-ordering queues. In a third embodiment, the flushing indication flushes all HARQ channels expecting data for a particular priority queue, which may be indicated in the Queue ID field included in the same control message used to send the flushing indication. This embodiment may be used to flush all HARQ channels for a particular priority queue after the transmission of all the data in the traffic burst meant for that priority queue has been completed.

The transmission of a flushing indication does not require significant resources and may be used to terminate early the inactivity timer maintained for a particular HARQ channel. Typically, the system knows which UEs have increased risk of missing packets in their re-ordering buffers. For example, UEs with better uplink to a cell other than the serving cell or high frame error rates (FERs) on the DPCH are more likely to have missing packets. For these UEs, a flushing indication may then be sent upon completion of the transmission of the traffic burst for each priority queue.

Detection of Activity on HARQ Channel/Delay Timer for Missing Packet

If the first transmissions of the packets occur in sequential order based on their TSNs, then missing packets may be identified by the TSNs of the recovered packets. In particular, a packet may be deemed as being missing if another packet with a later TSN is recovered first. (A later TSN may be smaller in value than an earlier TSN, when the TSN value wraps around.) In this case, the missing packet with an earlier TSN may be assumed to be in transmission.

At the moment a packet is detected to be missing, a set of candidate HARQ channels on which the missing packet may be sent can be identified. Thereafter, activities on the candidate HARQ channels may be monitored to determine whether or not any of these channels may have been the one used to send the missing packet. The candidate HARQ channels may thus be successively removed from the set, as described below. A missing packet is deemed to be lost if all candidate HARQ channels are removed and the set is empty. Appropriate action may then be taken by the re-ordering entity.

The HARQ channels to be included in the candidate set may be selected in various manners, which may be dependent on the available information. In a first embodiment, the candidate set is formed upon detecting a missing packet and would include all HARQ channels that may be used for packet transmission, except for the HARQ channel for the recovered packet that was used to detect the missing packet.

In a second embodiment, the candidate set for a missing packet is defined to include all active HARQ channels at the time the missing packet is detected. The snapshot of the candidate HARQ channels at this time would be accurate if at least one control message for the missing packet is received, since that control message would put the HARQ channel corresponding to the missing packet in the active state, and the channel would then be included in the candidate set for the missing packet.

However, this snapshot would not be accurate if all control messages for the HARQ channel used to send the missing packet were missed by the receiver. For example, if a control message for the first transmission of packet P1 sent on HARQ channel H1 is missed, then this channel would remain in the Inactive state. Thereafter, if another packet P2 for the same priority queue is sent on another HARQ channel and is decoded correctly (before packet P1 is retransmitted on HARQ channel H1), then packet P1 would be detected to be missing. However, the candidate set would not include HARQ channel H1 since it is inactive when the snapshot of the set is taken after packet P2 was recovered. The likelihood of these events occurring may be low, and the impact would be that packet P1 would be discarded by the re-ordering entity when it is finally recovered.

In a third embodiment, which avoids the problem described above, the candidate set for a missing packet is formed some amount of time after the missing packet was detected. This delay is selected to be long enough to ensure that at least one control message will be received for the missing packet before the candidate set is formed for the missing packet. A "delay" timer (denoted herein as TM2) may be used to keep track of the amount of time to wait before taking the snapshot of the candidate set.

Based on the specified reliability for the control channel, which is $10^{-2}$, the delay timer would only need be long enough to receive one additional control message transmission. If the delay timer is used, then the receiver would in effect need to miss two consecutive control message transmissions in order to form an inaccurate candidate set, and thus lose the packet. Based on a probability of miss of $10^{-2}$ for the control channel, two consecutive control channel misses would occur with a probability of $10^{-4}$, which is deemed acceptable. A longer value for the delay timer may degrade performance rather than affect the underlying scheme.

In a fourth embodiment, a candidate set is initially formed for each missing packet at the time the missing packet is detected, and would include all HARQ channels except for the HARQ channel of the recovered packet used to detect the missing packet (same as the first embodiment). However, a delay timer is also started. The candidate HARQ channels in the set may thereafter be removed if it is subsequently determined that the channel cannot be used to send the missing packet. At the expiration of the delay timer, the candidate set is modified and all HARQ channels that are not active at this time are removed from the set. The modified candidate set is a subset of the initial candidate set. For the fourth embodiment, the delay timer is used to catch HARQ channels for which all control messages have been missed previously by the receiver, similar to the third embodiment described above. However, the operation of the delay timer does not affect or impair the removal of HARQ channels from the initial formed candidate set (e.g., HARQ channels for which packets with later TSNs have been recovered).

For the embodiments that make use of the delay timer, this timer may be implemented in various ways, as described in further detail below.

If the Queue ID is also sent on the control channel and at least one control message is received for the missing packet, then the candidate set for the missing packet would only need to include the HARQ channels used for this priority queue. Performance may be enhanced since the number of candidate HARQ channels may be reduced.

The delay timer and flushing indication mechanisms can help put the HARQ channels into an inactive state by the time the candidate set is formed. For example, the inactivity timer for a given HARQ channel may elapse during the time the delay timer is active, in which case this HARQ channel would not be included in the candidate set. These mechanisms may thus restrict the set of candidate HARQ channels, which may improve the performance of the stall avoidance mechanism.

For all embodiments used to form the candidate set for a missing packet, the candidate HARQ channels are thereafter removed from the set if it is subsequently determined that they cannot be used to send the missing packet. In particular, a candidate HARQ channel is removed from the set if the pending transaction on the channel becomes completed.

In an embodiment, a packet transaction on an HARQ channel is deemed to be completed if any one of the followings conditions occurs: (1) the packet is recovered from the HARQ channel, (2) the HARQ channel is active and a new packet is detected to have been sent on the channel, (3) the inactivity timer for the HARQ channel expires, or (4) a flushing indication is received for the HARQ channel. Condition (1) results in the recovery of the missing packet or the recovery of a packet that is later than the missing packet. Condition (2) may be detected by observing the New Data indicator changes and may occur, for example, if the transmitter decides to abandon the prior packet and instead send a new packet on the HARQ channel. Conditions (1) and (2) also assume that initial transmissions are always performed in sequence and that a new packet is not transmitted on the same HARQ channel until the pending transaction is completed.

For a given missing packet, each HARQ channel in the associated candidate set may be removed if any of the four conditions described above occurs. When the candidate set is empty, then the missing packet is assumed to be lost (i.e., will not be recovered by the receiver). Appropriate action may then be performed. For example, all recovered packets stalled because of this missing packet may now be delivered to higher layers.

As noted above, the transmission of the Queue ID on the control channel may be used in conjunction with other mechanisms described above to improve performance. In particular, the Queue ID on the control channel may (1) reduce the number of candidate HARQ channels for a missing packet, (2) allow for possible tailoring of the inactivity timer to the priority queue, and (3) allow use of the flush indication even when other re-ordering entities are in the middle of transmissions.

In the following description, the candidate set is formed after the expiration of the delay timer, which is started when a missing packet is detected.

Example Transmissions

The various mechanisms described above to improve stall avoidance performance is described below for some example transmissions. For these examples, the NAK/ACK feedback on the HS-DPCCH is shown aligned with the time of the packet transmission that it relates to (for simplicity). The "transmitted" feedback values are those sent by the UE on the uplink, and the "received" feedback values are those detected by the Node B. The first transmissions for the packets are in sequential order based on the TSNs of the packets. Thus, missing packets may be determined based on the TSNs of the packets recovered by the UE.

In the following examples, a delay timer (TM2) is set when a packet is detected to be missing. A set of candidate HARQ channels for the missing packet is determined after the delay timer expires.

Figure 7A:
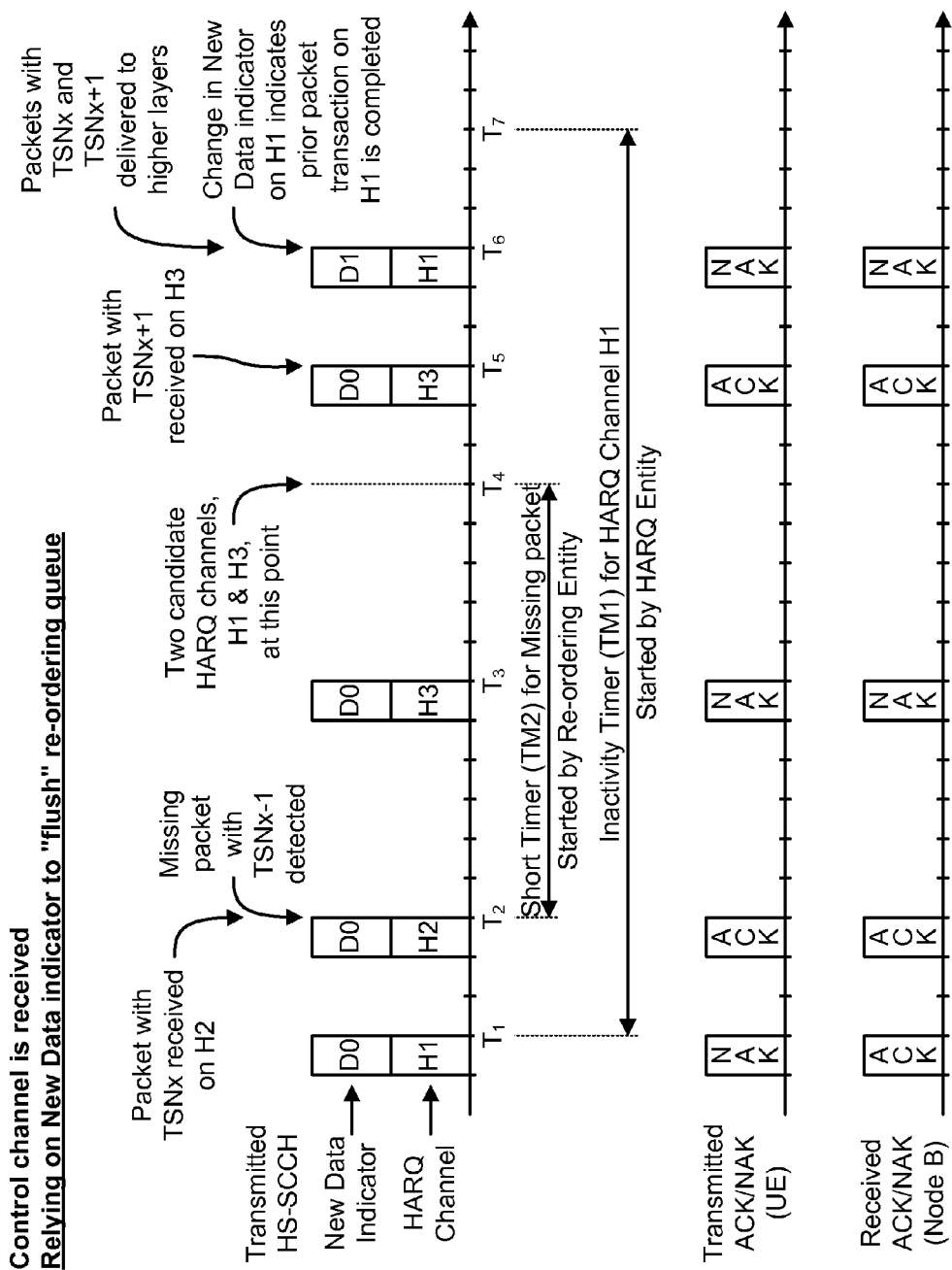
FIGS. 7A through 7D illustrate four data transmission scenarios whereby various mechanisms are relied on to flush data from the re-ordering queue to higher layers.

FIG. 7A illustrates a case where the control channel is received and the New Data indicator in the control message is relied on to flush data from the re-ordering queue to higher layers.

At time T1, a packet was received on HARQ channel H1 but not decoded correctly. For this packet transmission, the receiver sends a NAK feedback, which is erroneously received by the transmitter as an ACK. The state of HARQ channel H1 is set to Active and the HARQ entity restarts the inactivity timer (TM1) for this channel.

At time T2, a packet with TSNx was received on HARQ channel H2 and decoded correctly, and an ACK feedback is sent for this packet transmission. The state of HARQ channel H2 is set to Inactive. The recovered packet is then sent to the re-ordering entity for the priority queue of this packet. The re-ordering entity is able to detect that a packet with TSNx−1 is missing based on TSNx of the packet it just received. A delay timer (TM2) is then started for the missing packet. The recovered packet with TSNx is stalled because of the missing packet.

At time T3, a packet was received on HARQ channel H3 but not decoded correctly, and a NAK feedback is sent for this packet transmission. The state of HARQ channel H3 is set to Active, and the HARQ entity restarts the inactivity timer for this channel.

At time T4, the delay timer for the missing packet expires, and the set of candidate HARQ channels for the missing packet is determined. The candidate set for the missing packet includes all HARQ channels that are in the Active state at the expiration of the delay timer and which may be used to send the missing packet. The candidate set thus includes H1 and H3.

At time T5, a packet with TSNx+1 was received on HARQ channel H3 and decoded correctly, and an ACK feedback is sent for this packet transmission. The state of HARQ channel H3 is set to Inactive, and the HARQ entity restarts the inactivity timer for this channel. The recovered packet with TSNx+1 is also stalled because of the missing packet. Since the packet transaction for HARQ channel H3 is completed for a packet that comes later than the missing packet, this channel could not have been the one used to send the missing packet. H3 is thus removed from the candidate set, which now includes only H1.

At time T6, a new packet was received on HARQ channel H1, with the New Data indicator toggled from D0 to D1. The new packet was sent by the transmitter on this channel because it erroneously receives an ACK for the prior packet transmission at time T1. This change in the New Data indicator signifies that the pending packet transaction on HARQ channel H1 is completed, and that the missing packet will not be sent on this channel. H1 is thus removed from the candidate set, which is now empty. The two stalled packets with TSNx and TSNx+1 are then delivered to higher layers.

Figure 7B:
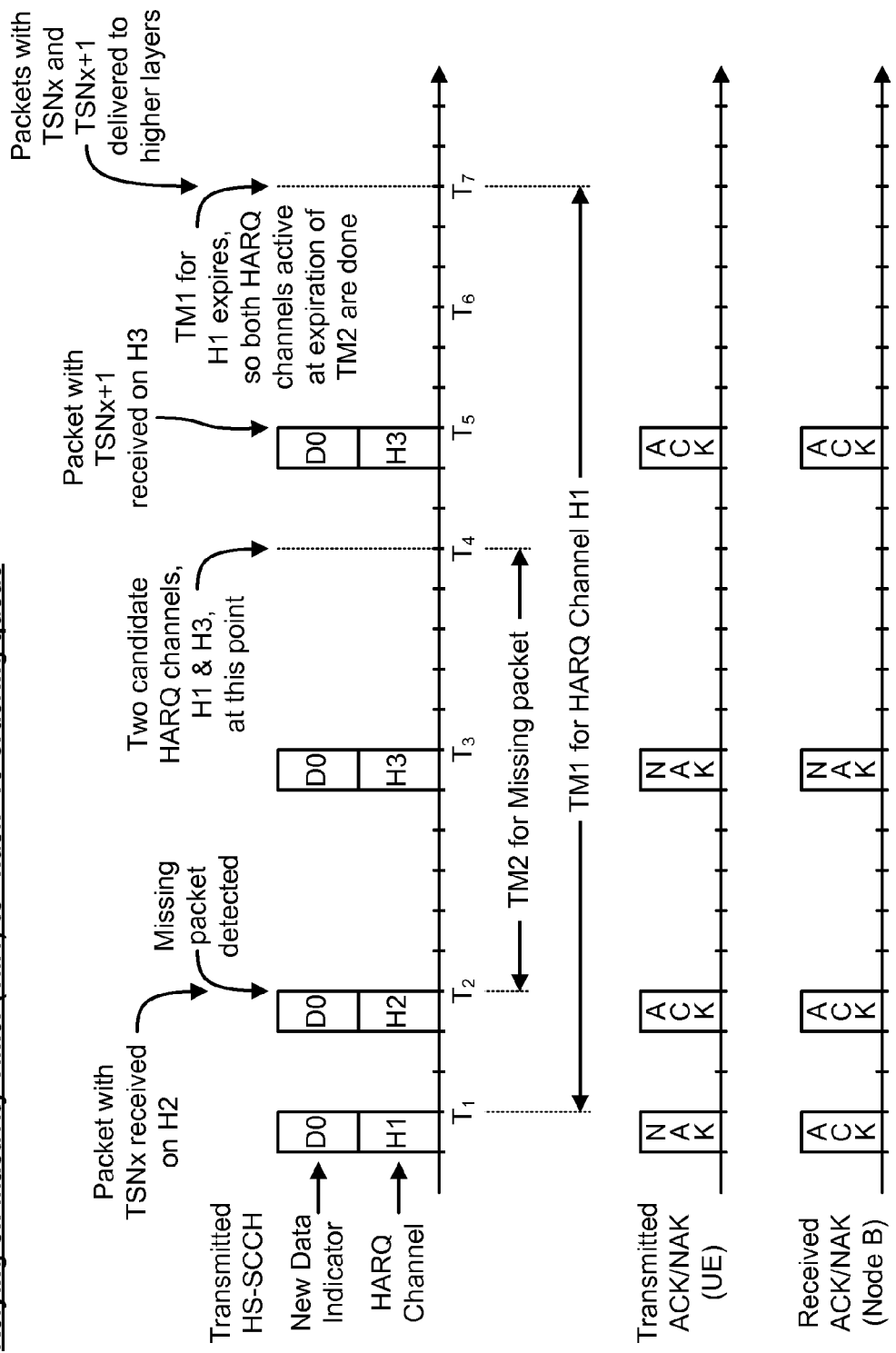

FIG. 7B illustrates a case where the control channel is received and the inactivity timer (TM1) is relied on to flush data from the re-ordering queue to higher layers. The packet transmissions in FIG. 7B are similar to that shown in FIG. 7A, except that a packet transmission was not received at time T6. At time T7, the inactivity timer for HARQ channel H1 expires. This indicates that the missing packet is not expected to be received on this channel. H1 is thus removed from the candidate set, which then becomes empty. The two stalled packets with TSNx and TSNx+1 are then delivered to higher layers.

Figure 7C:
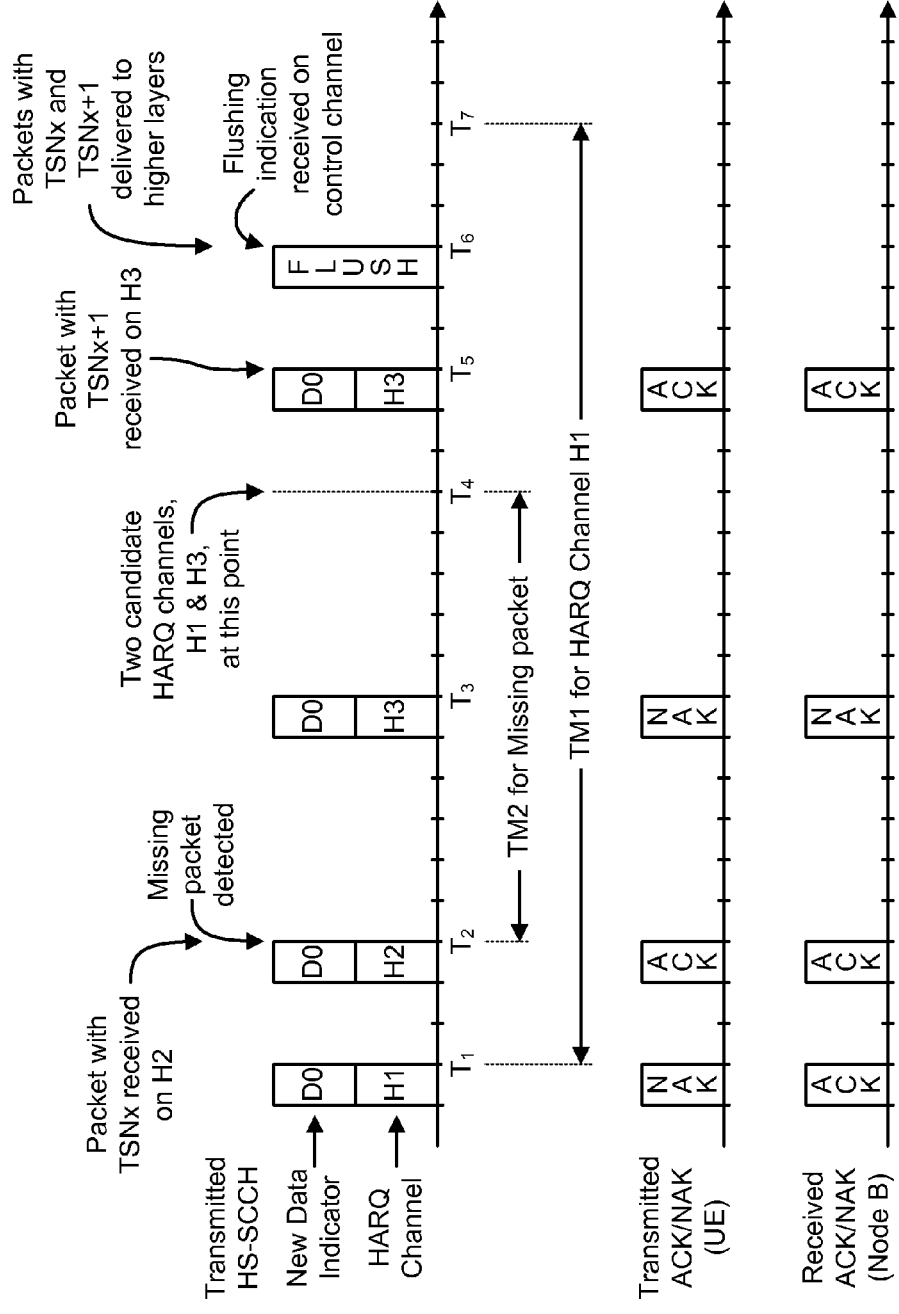

FIG. 7C illustrates a case where the control channel is received and a flushing indication sent on the control channel is relied on to flush data from the re-ordering queue to higher layers. The packet transmissions in FIG. 7C are similar to that shown in FIG. 7A, except that a flushing indication (instead of a packet transmission) was received at time T6. For this example, the flushing indication covers all HARQ channels used for the priority queue identified in the control message. H1 and H3 would then be flushed because they are used for the identified priority queue. The candidate set for the missing packet would then become empty. The stalled packets with TSNx and TSNx+1 are then delivered to higher layers.

Figure 7D:
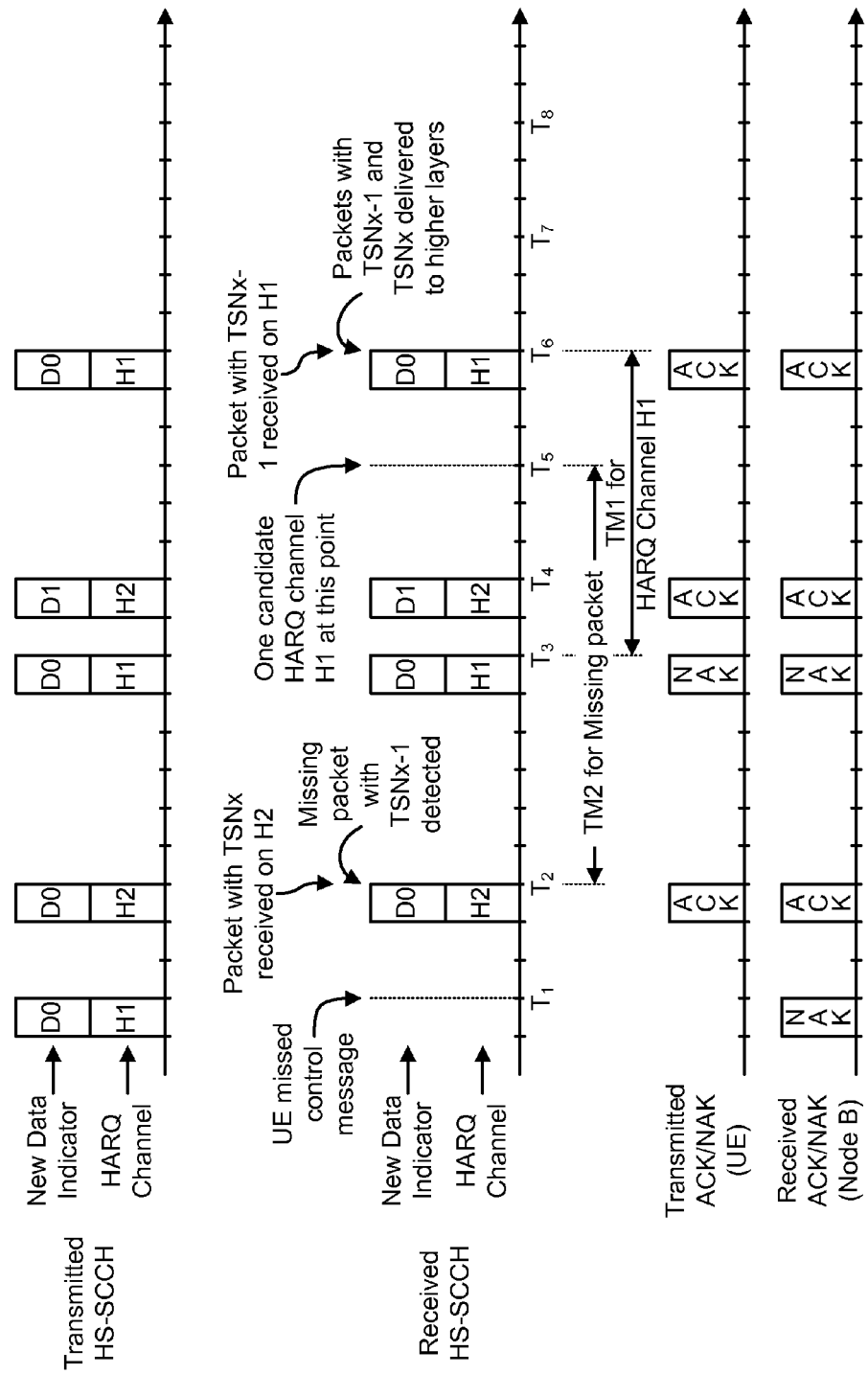

FIG. 7D illustrates a case where the control channel is not received and a DTX to NAK error is received by the transmitter. FIG. 7D also shows a situation where the use of the delay timer allows for the correct determination of the candidate set for a missing packet, which would have been lost otherwise.

At time T1, a packet was sent on HARQ channel H1 but the control channel was not received (i.e., missed). The receiver does not know the existence of this packet transmission and sends a DTX (i.e., no feedback), which is erroneously received by the transmitter as a NAK. Because the receiver is not aware of the packet transmission, the state of HARQ channel H1 remains set to Inactive and the inactivity timer for this channel is not restarted.

At time T2, a packet with TSNx was received on HARQ channel H2 and decoded correctly, and an ACK feedback is sent for this packet transmission. The state of HARQ channel H2 is set to Inactive, and the inactivity timer for this channel is restarted (not shown in FIG. 7D). The recovered packet is then sent to the re-ordering entity for the priority queue of this packet. The re-ordering entity is able to detect that a packet with TSNx−1 is missing based on the TSNx of the packet it just received. A delay timer is then started for the missing packet.

At time T3, a packet retransmission was received on HARQ channel H1 for the NAK detected by the transmitter at time T1. This packet is not decoded correctly, and a NAK feedback is sent for the packet transmission. The state of HARQ channel H1 is set to Active, and the HARQ entity restarts the inactivity timer for this channel (not shown in FIG. 7D).

At time T4, a new packet with TSNx+1 was received on HARQ channel H2 with the New Data indicator changed to a new value (i.e., from D0 to D1). This packet was decoded correctly, and an ACK feedback is sent for this packet transmission. The state of HARQ channel H2 is set to Inactive, and the HARQ entity cancels the inactivity timer for this channel.

At time T5, the delay timer for the missing packet expires. At this point, there is one Active HARQ channel, H1. The candidate set would then include only HARQ channel H1.

As shown in this example, the use of the delay timer allows for the determination of the correct candidate set for the missing packet. Without the delay timer, the candidate set would be an empty set since the control message at time T1 for the packet with TSNx−1 was missed. With the delay timer, the second transmission at time T3 within the delay timer window allows HARQ channel H1 to be included in the candidate set.

At time T6, the missing packet with TSNx−1 was received on HARQ channel H1 and decoded correctly, and an ACK feedback is sent for this packet transmission. The packets with TSNx−1 and TSNx are then delivered to higher layers.

At time T7, a packet retransmission was received on HARQ channel H2 for the packet with TSNx+1, which was NAKed at time T4. This packet was decoded correctly and delivered by the re-ordering entity to higher layers. An ACK feedback is also sent for the packet.

Specific Implementation

For clarity, a specific implementation of the processing performed by the HARQ entities and the re-ordering entities at the transmitter and receiver is described below. This implementation maintains a delay timer for a missing packet to allow for a candidate set to be more accurately formed for the missing packet. However, this delay timer is not strictly necessary as described above. If the delay timer is not used, then the resulting behavior is equivalent to setting the delay timer value to 0.

In the following implementation, it is assumed that the Queue ID is sent on the control channel, and the priority queue of a given packet it is not known to the HARQ entity until the packet is decoded correctly. In this case, when a packet transaction is completed, the HARQ entity notifies all of the re-ordering entities since the lost packet could have been for any priority queue. Moreover, when the delay timer expires, the re-ordering entity does not know which HARQ channels carry data for it, and would therefore include all active HARQ channels in the candidate set for the missing packet.

Transmitter HARQ

Figure 8:
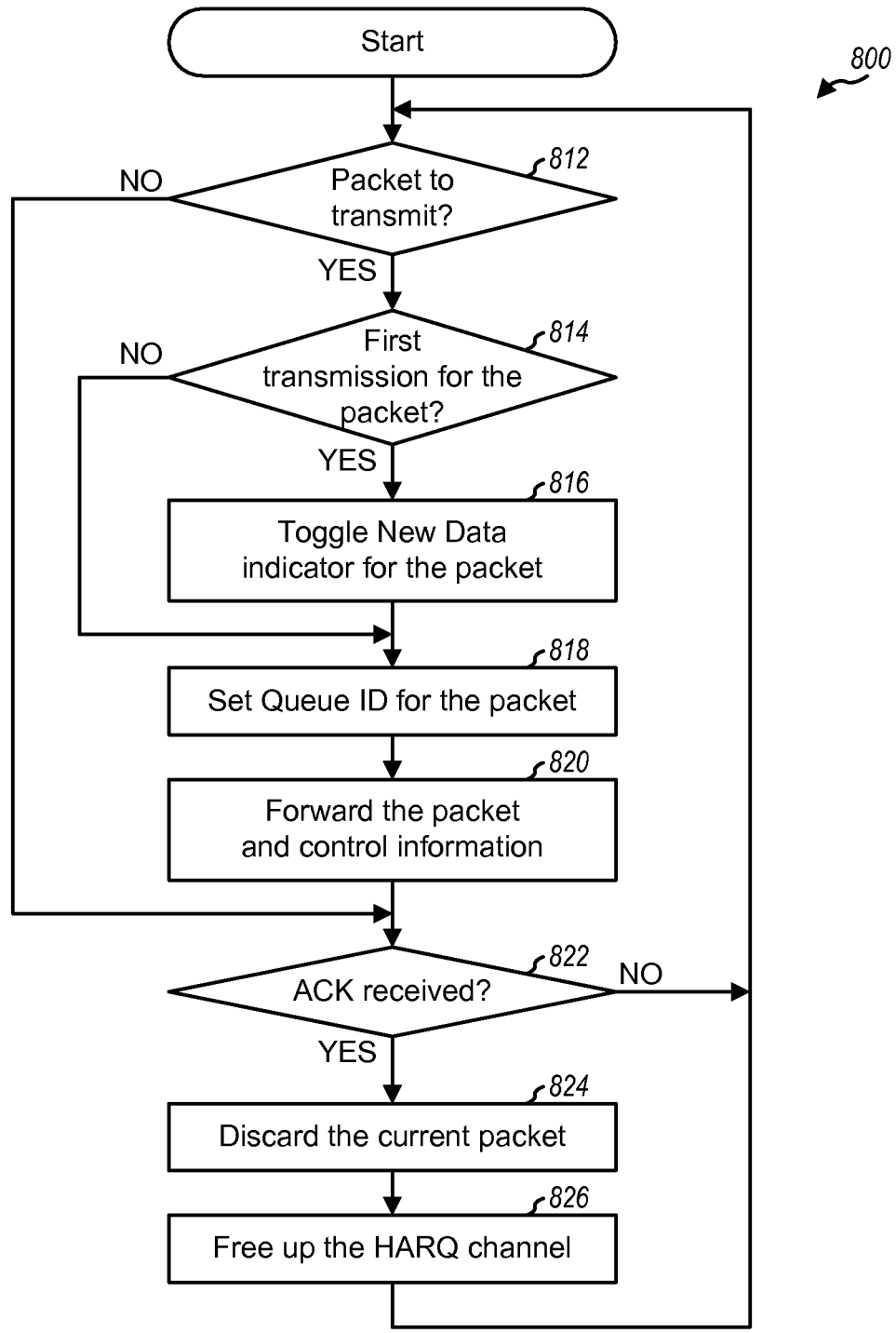
FIG. 8 is a flow diagram of a process performed by the transmitter HARQ entity to send a packet on a particular HARQ channel.

FIG. 8 is a flow diagram of an embodiment of a process 800 performed by the transmitter HARQ entity to send a packet on a particular HARQ channel. For this embodiment, a local variable NewData is maintained for each HARQ channel. This variable toggles for the first transmission of a new packet when the payload to be transmitted changes. This variable is initialized to "1".

Initially, a determination is made whether or not there is a packet to be transmitted (step 812). If the answer is no, then the process proceeds to step 822. Otherwise, a determination is made whether or not this is the first transmission of the packet (step 814). If the answer is again yes, then the NewData variable is toggled (i.e., set to "0" for the first new packet), and the New Data indicator in the control message for the packet is also toggled since it is set to the NewData value (step 816). Otherwise, if the packet is being retransmitted, then step 816 is skipped and the NewData variable is not toggled. The Queue ID in the control message for the packet (if it is sent there) is set to the priority queue of the packet being transmitted (step 818). The packet and the control message (which would include the HID, Queue ID, New Data indicator, and so on) are then forwarded to the physical layer for transmission (step 820).

In step 822, a determination is made whether or not an ACK was received from the UE for a current packet transmission (if any) on the HARQ channel. If the answer is yes, then the current packet being transmitted on this channel is discarded (step 824), and the scheduler is informed that this HARQ channel is available to send another packet (step 826). After step 826, or if an ACK was not received in step 822, the process returns to step 812.

Receiver HARQ

Figure 9A:
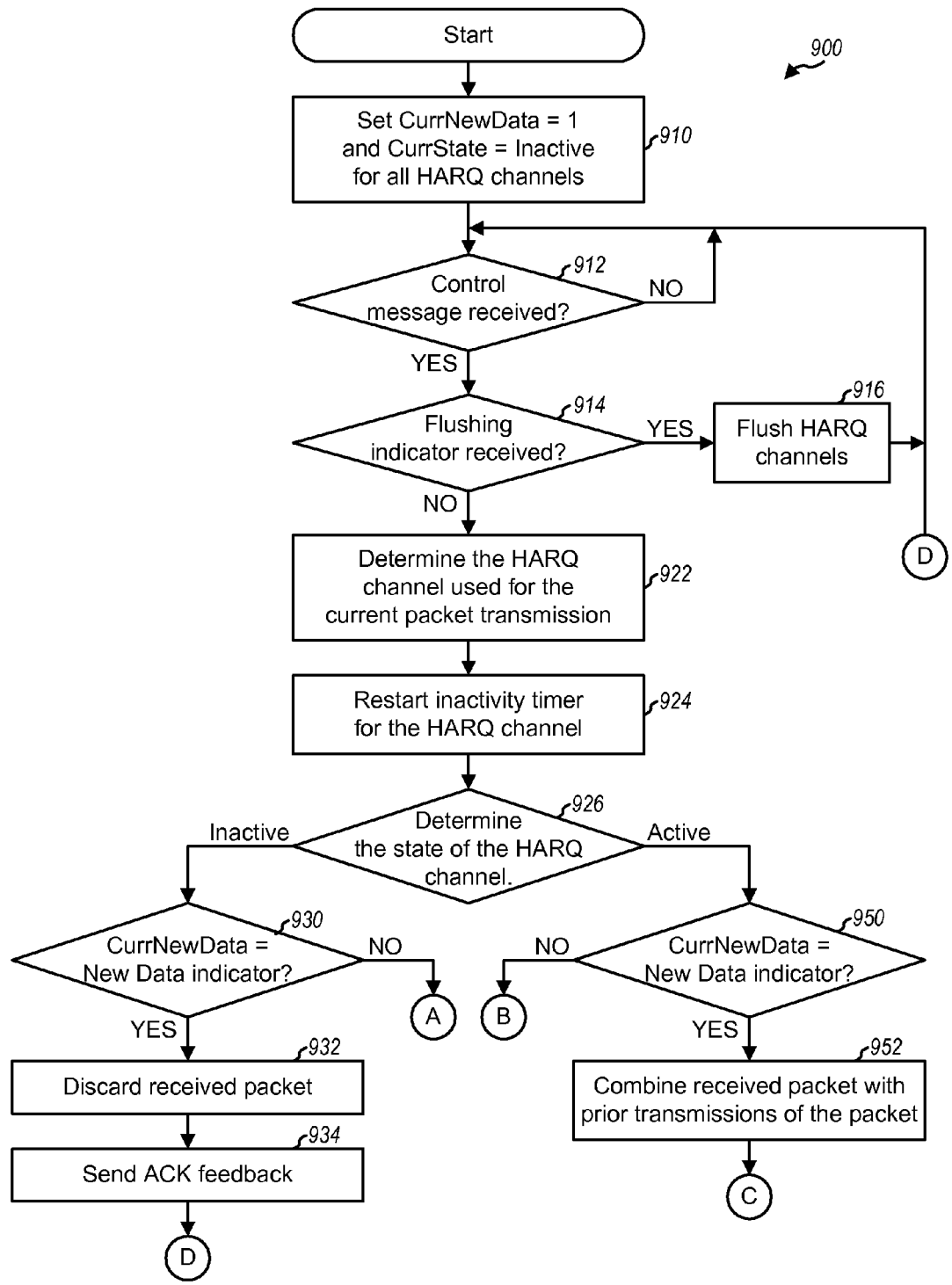
FIGS. 9A and 9B show a flow diagram of a process performed by the receiver HARQ entity to receive a packet on a particular HARQ channel.
Figure 9B:
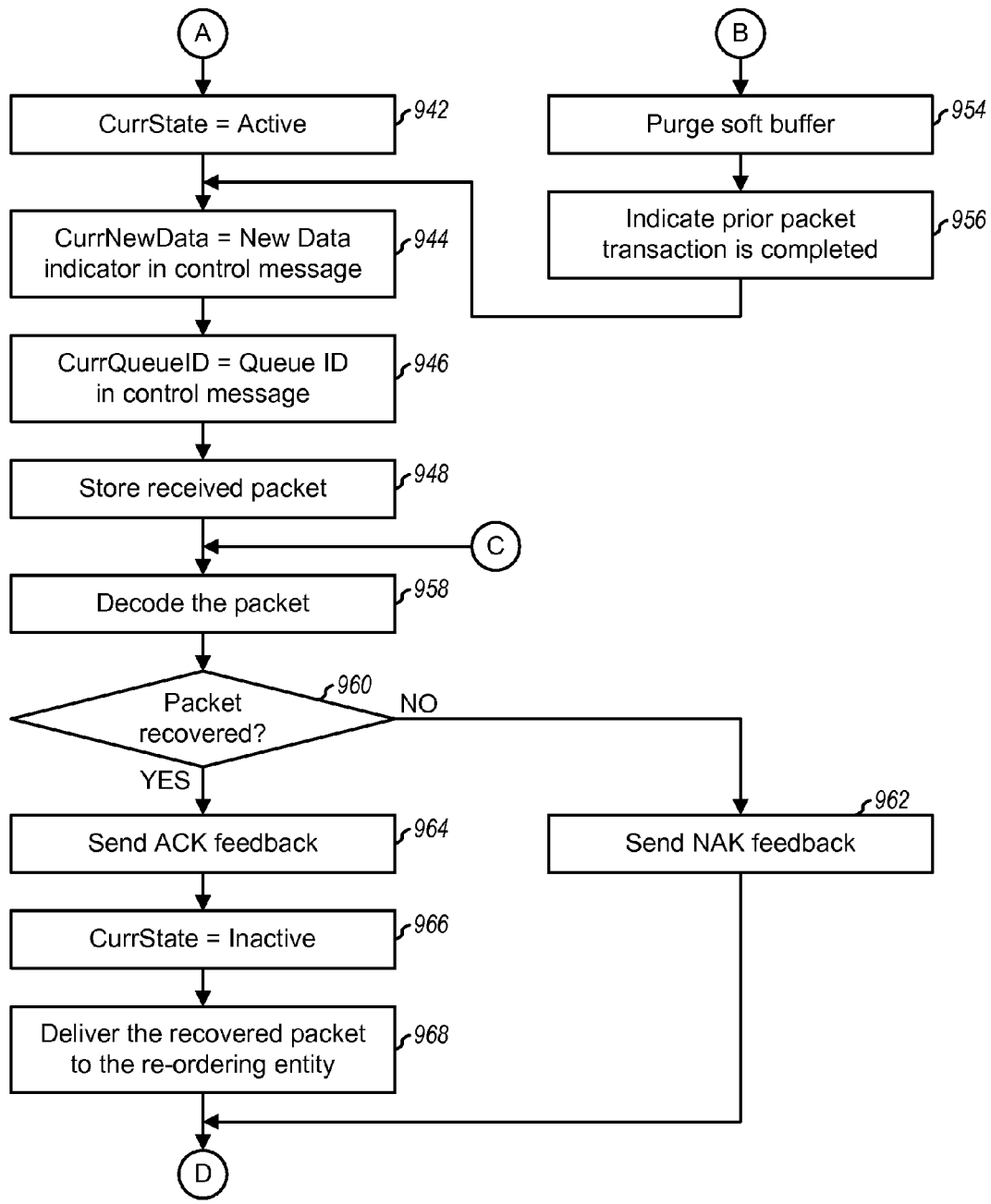

FIGS. 9A and 9B show a flow diagram of an embodiment of a process 900 performed by the receiver HARQ entity to receive a packet on a particular HARQ channel. Three local variables, CurrNewData, CurrQueueID, and CurrState, are maintained for each HARQ channel. The CurrNewData variable holds the value of the New Data indicator for the current transmission on the HARQ channel, and the CurrQueueID variable holds the value of the Queue ID for the current transmission. The CurrState variable indicates the current state of the HARQ channel and is either Inactive or Active.

One inactivity timer is also maintained for each HARQ channel. In an embodiment, the inactivity timer is set long enough so that there is a high probability of two packet transmissions occurring on the HARQ channel before the inactivity timer expires. However, other values may also be used for the inactivity timer, and this is within the scope of the invention.

The variables for each HARQ channel are initialized by setting CurrNewData to "1" and CurrState to Inactive (step 910). A determination is made whether or not a control message was received on the control channel for the UE (step 912). If the answer is no, then the process returns to step 912 and waits. Otherwise, a determination is made whether or not the control message includes a flushing indication (step 914). If the answer is yes, then one or more HARQ channels are flushed, depending on the particular flushing scheme being implemented (step 916). The flushing may be performed as described below in FIG. 9D. As part of the flushing processing, the re-ordering entity for each flushed HARQ channel is informed that the packet transaction is completed on that channel. Since a control message with the flushing indication is sent to only flush HARQ channels, and no packet is transmitted concurrent with the control message, the process thereafter returns to step 912 to wait for the next control message.

If the received control message was not sent to flush the HARQ channels, as determined in step 914, then it is one sent for a packet transmission on the HS-DSCH. In that case, the particular HARQ channel used for the current packet transmission is determined from the HID field in the control message (step 922). The inactivity timer for this HARQ channel is then restarted (step 924). As described above, the inactivity timer for the HARQ channel is restarted whenever a control message is received for the channel, and if no activity is detected for the channel by the time the inactivity timer expires, then the channel is deemed to be inactive and appropriate actions may be performed. The inactivity timer is used to avoid the situation whereby the HARQ entity waits indefinitely for a packet transmission on a particular HARQ channel, which is not sent for any number of reasons. The processing to be performed upon expiration of the inactivity timer is described below.

The current state of the HARQ channel is then determined based on the CurrState variable (step 926), and the processing to be performed for the HARQ channel is dependent on the current state.

If the HARQ channel is in the Inactive state, indicating that the prior packet transaction is completed, then the current transmission is expected to be the first transmission for a new packet. In that case, a determination is made whether or not the CurrNewData value is equal to the New Data indicator in the control message for this packet transaction (step 930). If they are the same, indicating that the current transmission is not for a new packet, then the received packet is discarded (step 932), an ACK is sent back to the transmitter (step 934), and the process returns to step 912 to wait for the next control message. The prior packet may have been sent, for example, if the receiver sends an ACK for the prior packet transmission but the transmitter erroneously receives a NAK instead and retransmits the prior packet.

Otherwise, if the CurrNewData value is not equal to the New Data indicator, indicating that the current transmission is for a new packet, then the variables for the HARQ channel are updated by setting CurrState to Active (step 942), CurrNewData to the New Data indicator in the control message (step 944), and CurrQueueID to the Queue ID value in the control message (if it is sent there) (step 946). The new packet received on the HS-DSCH is then stored in a soft buffer used for the priority queue identified by the CurrQueueID value (step 948). The process then proceeds to step 958.

Back in step 926, if the HARQ channel is in the Active state, then the current transmission is expected to be a retransmission for the current packet, since this transaction is still pending. In that case, a determination is made whether or not the CurrNewData value is equal to the New Data indicator in the control message (step 950). If they are the same, indicating that the current transmission is indeed a retransmission, then the received packet is combined with prior transmissions of the packet (step 952) and the process then proceeds to step 958.

Otherwise, if the CurrNewData value is not equal to the New Data indicator as determined in step 950, then the current transmission is for a new packet. The new packet may have been sent, for example, if the transmitter decided to abandon the pending transaction before it is completed or erroneously receives an ACK for a transmitted NAK. In that case, the prior packet in the soft buffer is purged (step 954). If the priority queue for the prior packet is known (e.g., as identified by the CurrQueueID value, which may be obtained from the Queue ID included in the control message), then the re-ordering entity for this priority queue is informed that the transaction for the prior packet is completed (step 956). If the priority queue of the prior packet is not known (e.g., not sent on the control message), then all re-ordering entities may be informed of the completed transaction on this HARQ channel. The variables for the HARQ channel are then updated by setting CurrNewData to the New Data indicator in the control message (step 944) and setting CurrQueueID to the Queue ID value in the control message (if it is sent there) (step 946). The new packet received on the HS-DSCH is then stored in the soft buffer (step 948), which was just purged of the prior packet. The process then proceeds to step 958.

In step 958, the packet just received, which may have been combined with prior transmissions (if any) received for the packet, is then decoded to attempt to recover the packet. If the packet is not recovered, as determined in step 960, then a NAK feedback is sent to the transmitter (step 962), and the process returns to step 912. Otherwise, if the packet was successfully recovered, then an ACK feedback is sent (step 964), the current state of the HARQ channel is set to Inactive to indicate that the current packet transaction is completed and that no additional transmissions are expected on this HARQ channel (step 966), and the recovered packet is sent to the re-ordering entity for the priority queue identified by the CurrQueueID value (step 968). The process thereafter returns to step 912 to wait for the next control message.

Figure 9C:
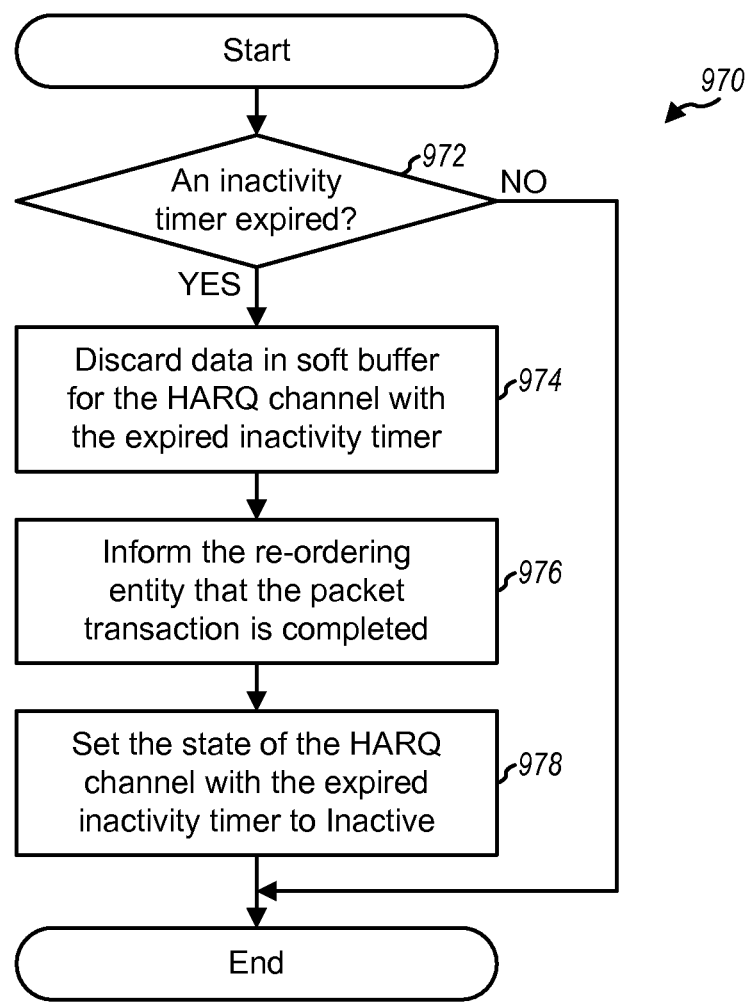
FIG. 9C is a flow diagram of a process performed by the receiver HARQ entity to maintain all of the inactivity timers for the HARQ channels.

FIG. 9C is a flow diagram of an embodiment of a process 970 performed by the receiver HARQ entity to maintain the inactivity timers for the HARQ channels. The steps in this process may be performed for each TTI.

Initially, a determination is made whether or not an inactivity timer has expired (step 972). Typically, only one inactivity timer, if any, expires in any given TTI since each timer is restarted at a different time whenever a control message is received for the HARQ channel associated with the timer. If no inactivity timer has expired, then the process returns to step 972 and waits. Otherwise, the data in the soft buffer for the HARQ channel with the expired inactivity timer is discarded (step 974). The re-ordering entity handling the priority queue for the last packet transmission on the HARQ channel with the expired inactivity timer is then informed that this packet transaction is completed (step 976). The state of the HARQ channel with the expired inactivity timer is then set to Inactive (step 978), and the process returns to step 972.

Figure 9D:
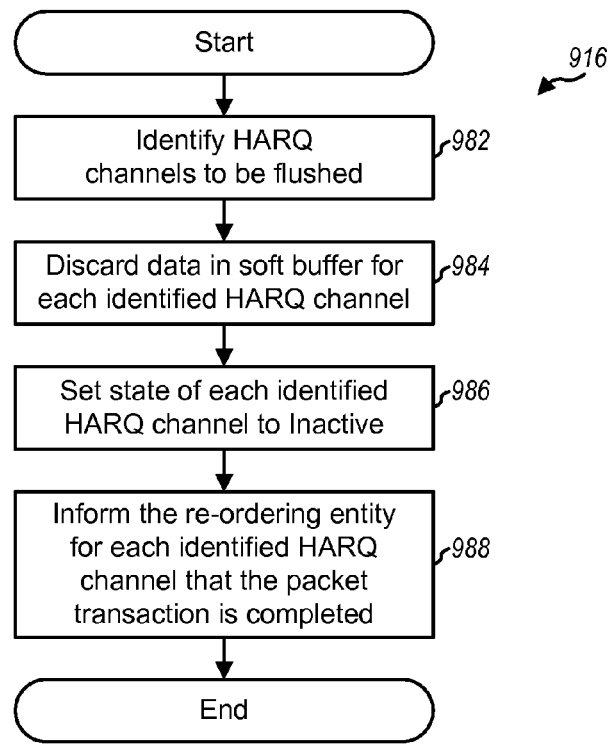
FIG. 9D is a flow diagram of a process performed by the receiver HARQ entity upon receiving a flushing indication on a control message.

FIG. 9D is a flow diagram of an embodiment of a process performed by the receiver HARQ entity upon receiving a flushing indication on a control message. This process may be performed for step 916 in FIG. 9A. Initially, the HARQ channels to be flushed are identified (step 982). In one embodiment, these HARQ channels are identified as those used for a particular priority queue identified by the Queue ID value included in the control message itself. In other embodiments, the flushing indication may flush a specific HARQ channel, all HARQ channels, or some set of ascertainable HARQ channels. In any case, the data in the soft buffer for each identified HARQ channel is discarded (step 984). The state of each identified HARQ channel is then set to Inactive (step 986). The re-ordering entity handling each identified HARQ channel is then informed that the packet transaction on this channel is completed (step 988). The process then terminates.

Transmitter Re-Ordering Entity

The transmitter may maintain a window for each priority queue. This window would have the same size as that used by the receiver and is used to flush out old data that will not be transmitted because the receiver would discard the data anyway, as described above. At the transmitter, if packets for a given priority queue are transmitted in sequential order based on their TSNs, then the leading edge of the window may be set to the latest TSN of the packets sent. Thereafter, as each new packet is transmitted, the window leading edge is moved to the TSN of this packet. As the window is slid forward for each new packet transmission, all packets with TSNs older than the trailing edge of the window are discarded.

At the transmitter, one "transmitter re-ordering entity" is responsible for determining packets to be transmitted on the HS-DSCH for each priority queue. The transmitter re-ordering entity is the protocol peer of the re-ordering entity at the transmitter. The transmitter re-ordering entity maintains the window for the associated priority queue. A local variable TxLeadWinEdge is used to indicate the leading edge of the window and is initially set to "0". The size of the window is denoted by a local variable WindowSize.

Figure 10:
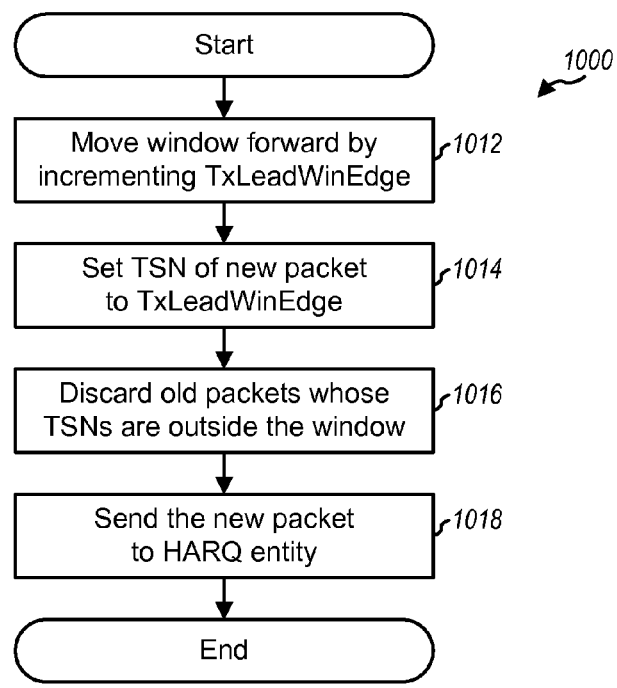
FIG. 10 is a flow diagram of a process performed by the transmitter re-ordering entity for a particular priority queue.

FIG. 10 is a flow diagram of an embodiment of a process 1000 performed by the transmitter re-ordering entity for a particular priority queue. The steps shown in FIG. 10 are performed whenever a new packet is scheduled to be transmitted for this priority queue.

For the new packet to be sent, the transmitter re-ordering entity first slides the window forward by incrementing the TxLeadWinEdge variable (step 1012). The TSN for the new packet is then set to the updated TxLeadWinEdge value (step 1014). Any pending packets with TSNs outside the window are then discarded (step 1016). In particular, packets with TSN≤(TxLeadWinEdge−WindowSize) would fall outside the window and are discarded. (Modulo-WindowSize operations are performed to account for wrap-around in the TSN number space.) The reason for discarding these packets is because they will fall outside the window at the receiver and will be discarded if received. The new packet is then sent to the HARQ entity designated to process the packet (step 1018). The process then terminates.

If the channel conditions for the receiver are poor, then a flushing indication may be sent to the receiver when the transmission of all data in a data burst for a particular priority queue is completed. This flushing indication may be used to flush all HARQ channels used for the priority queue, as described above. The flushing indication may be sent, for example, if the serving cell is not the one with the best uplink to the UE and there is greater likelihood of not correctly receiving the NAK/ACK feedback from the UE.

Receiver Re-Ordering Entity

At the receiver, one receiver re-ordering entity is responsible for processing the data for each priority queue. The receiver re-ordering entity receives packets recovered by the HARQ entity for the associated priority queue, re-orders these packets, and delivers those packets that are in sequence to higher layers. The re-ordering entity maintains a window with a size that is replicated at the transmitter. A local variable RxLeadWinEdge is used to indicate the latest TSN received for the priority queue and is initially set to "0". The size of the window is denoted by a local variable WindowSize. Packets with TSNs within the range {(RxLeadWinEdge−WindowSize+1) . . . RxLeadWinEdge} are deemed to be within the receiving window.

In one embodiment, each receiver re-ordering entity is able to start multiple delay timers, one for each hole detected within the window. The delay timer is set long enough such that there is a high probability of at least one control message transmission being sent for the HARQ channel used to send the missing packet before the timer expires. Each delay timer is associated with a particular Missing packet.

FIG. 6B is a diagram illustrating a window maintained by the receiver re-ordering entity. The packets are identified and referred to by their TSNs. In an embodiment, from the receiver re-ordering entity's perspective, each packet within the TSN number space is associated with one of four possible states: Delivered, Received, Missing, and Expected. A packet is considered (1) Delivered if it has been received from the HARQ entity and sent to higher layers, (2) Received if it has been received from the HARQ entity but not yet delivered to higher layers, (3) Missing if it is part of a hole within the window, and (4) Expected if it falls outside the window. A packet is deemed Missing if another packet with a later TSN is received before it. A hole appears whenever there are one or more consecutive Missing packets in the window. There may be zero, one, or multiple holes in the window at any given moment. Initially, the state of all packets within the window is set to Delivered and those outside the window are set to Expected.

In an embodiment, for each packet in the Missing state (i.e., a Missing packet), the receiver re-ordering entity maintains a MaskVector to mark the candidate HARQ channels for the Missing packet. The MaskVector is thus used to indicate whether or not each of the HARQ channels may be used to send the Missing packet. The MaskVector has a size equal to the number of all HARQ channels that may be used for transmission for all priority queues, and includes one element for each possible HARQ channel.

The MaskVector for each Missing packet is "initialized" when the missing packet is first detected. The initial candidate set would have the element for each HARQ channel set to "1" except for the element for the HARQ channel for the received packet that was used to detect the missing packet, which is set to "0". A value of "1" indicates that the associated HARQ channel may be used to send the Missing packet, and a value of "0" indicates that the channel could not be used to send the Missing packet. Thus, the initial candidate set includes all HARQ channels except for the one known HARQ channel that could not be used to send the missing packet. Thereafter, the element for each candidate HARQ channel may be set to "0" if it is determined that the channel could not be used to send the Missing packet. This would be the case if: (1) a new packet is sent on the HARQ channel, as determined by a change in the New Data indicator for the channel, (2) the inactivity timer for the channel expires, or (3) a flushing indication is received for the channel.

The MaskVector for each Missing packet is also "modified" when the delay timer applicable for the Missing packet expires. The modified candidate set would be purged of all HARQ channels that are not active when the delay timer expires (by setting the elements in the MaskVector for these HARQ channels to "0"). The process to eliminate the remaining HARQ channels from the candidate set would then proceed as before.

Figure 11A:
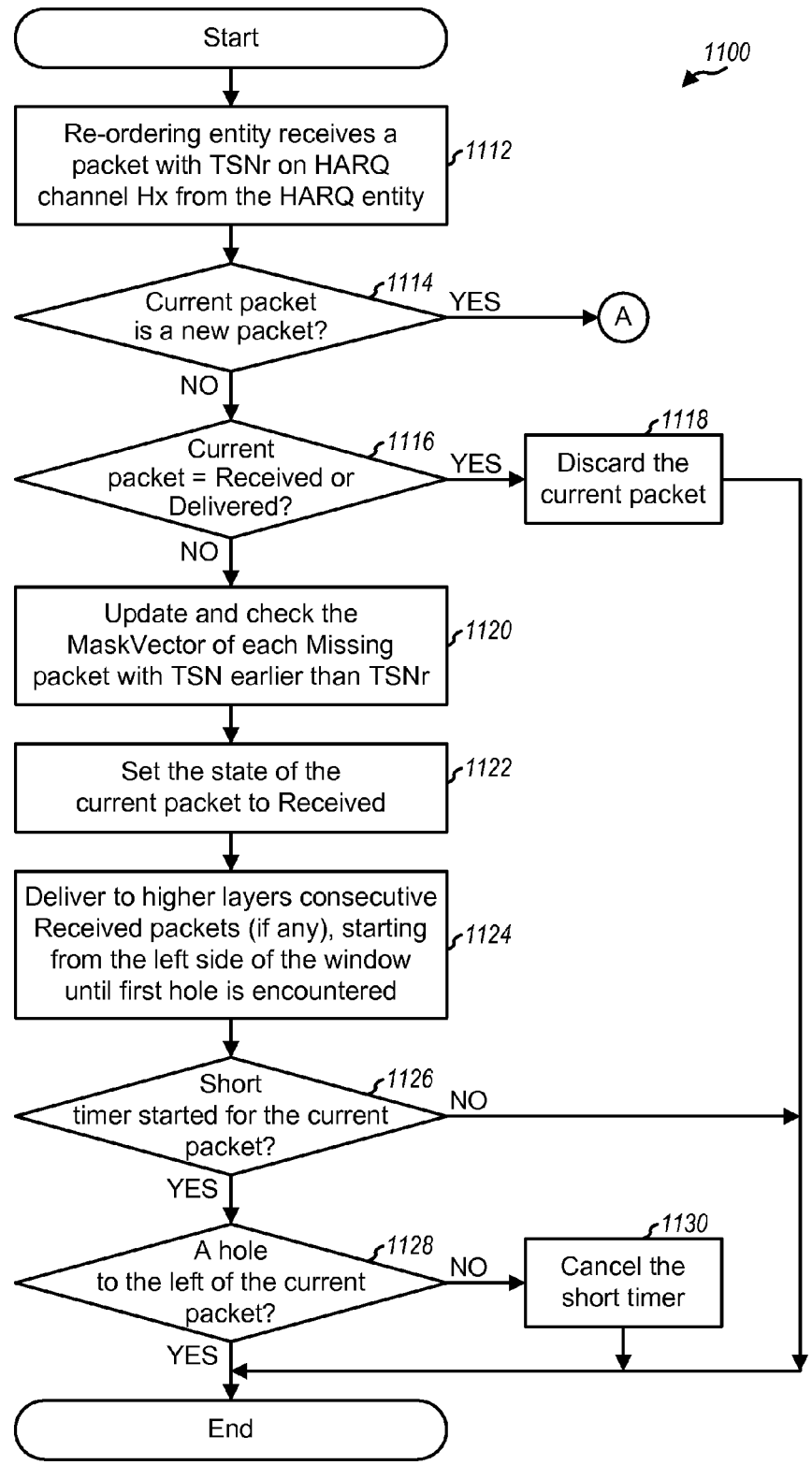
FIGS. 11A and 11B show a flow diagram of a process performed by the receiver re-ordering entity for a particular priority queue.
Figure 11B:
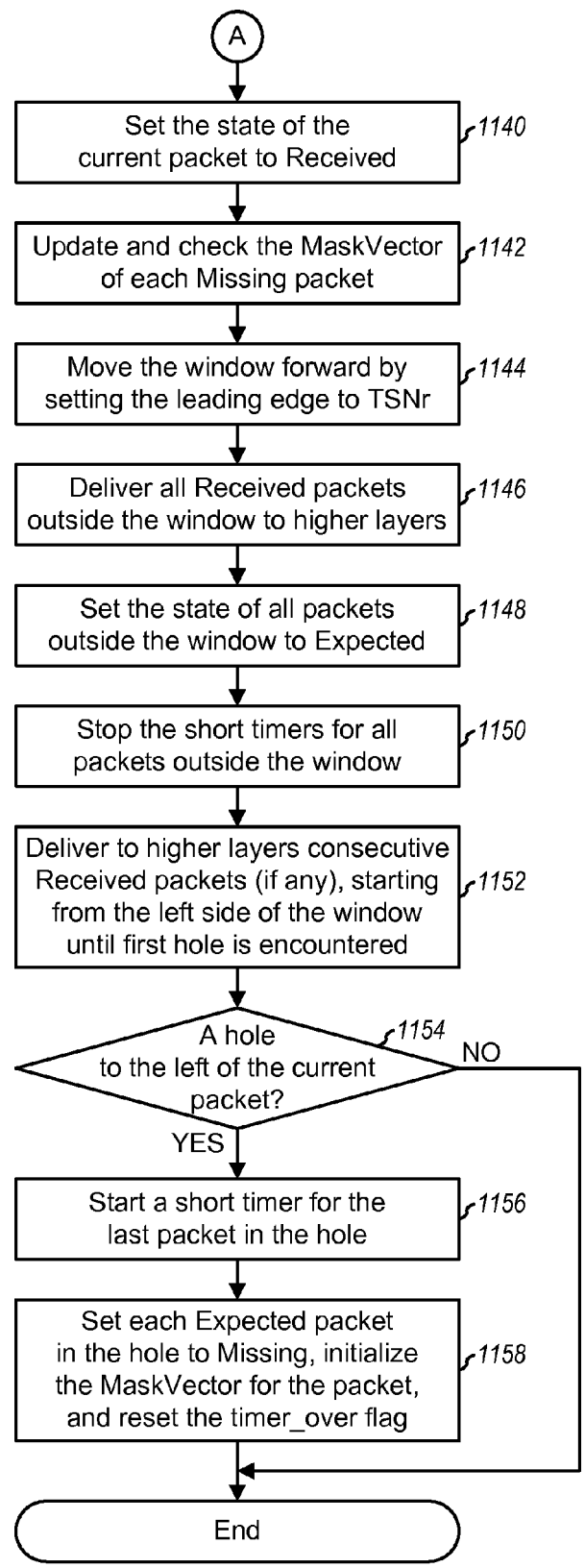

FIGS. 11A and 11B show a flow diagram of an embodiment of a process 1100 performed by the receiver re-ordering entity for a particular priority queue. Initially, the receiver re-ordering entity receives a packet with TSNr on HARQ channel Hx from the HARQ entity (step 1112). A determination is then made whether or not the just-received packet (i.e., the current packet) is a new packet (step 1114). The current packet is deemed a new packet if TSNr falls outside the window, and is deemed a retransmission of a pending packet if TSNr falls within the window. If the current packet is a new packet, then the process proceeds to step 1140.

Otherwise, if TSNr falls within the window, then the current packet is either (1) a duplicate of a prior received packet or (2) one for a Missing packet that will partially or completely fill a hole within the window. A determination is then made whether or not the current packet is one that has already been received or delivered (step 1116). If the answer is yes, then the current packet is a duplicate and discarded (step 1118), and the process terminates.

Otherwise, if the answer is no in step 1116, then the current packet is for a Missing packet within the window. In that case, the MaskVector of each earlier Missing packet (i.e., those with TSN earlier than TSNr) is updated by setting the element corresponding to HARQ channel Hx to "0" (step 1120). This is because a later packet with TSNr was received on this channel and could not be the one used to send the earlier Missing packet. Each time the MaskVector is updated, it is also checked to determine whether or not all elements of the MaskVector are "0s", which would indicate that the candidate set is empty and that the Missing packet is lost. If the MaskVector includes all "0s", then all Received packets that are stalled by this Missing packet are delivered to higher layers, and all packets earlier than this packet are set to Delivered.

The state of the current packet is then set to Received (step 1122). All Received packets (if any) not currently stalled by a hole are delivered to higher layers (1124). In particular, consecutive Received packets starting from the left side of the window and continuing until the first hole (or a Missing packet) is detected are identified and sent to higher layers. The state of these delivered packets is also set to Delivered.

In an embodiment, one delay timer is maintained for the last packet in each "original" hole, which is a hole that occurs whenever a new packet is received by the re-ordering entity and there are one or more Expected packets earlier than (or to the left of) the new packet. The state of the Expected packets in the hole is changed to Missing. This is described in further detail below. Subsequently, a packet may be received by the re-ordering entity for a Missing packet in this hole. If the hole is a width of one packet, then the received packet would completely cover the hole and the delay timer is canceled. Otherwise, if the hole covers multiple packets and the current packet is the last Missing packet in this hole, then the delay timer is moved to the (new) last Missing packet in the partially covered hole. And if the hole covers multiple packets and the current packet is not the last Missing packet in the hole, then the delay timer is not affected. With this implementation, only one delay timer needs to be maintained for all missing packets within an original hole (since they were detected at the same time), even if this hole is subsequently chopped up into multiple holes by packets received later by the re-ordering entity.

Thus, a determination is made whether or not a delay timer has been started for the current packet (step 1126). If the answer is no, then the process terminates. Otherwise, a determination is made whether or not there is a hole to the left of the current packet (step 1128). If the answer is no, then the delay timer for the current packet is canceled, since this would indicate that the current packet completely fills the hole, in which case the delay timer does not need to be maintained (step 1130). Otherwise, if the current packet does not fill a hole, then no action is performed with respect to the delay timer. In either case, the process then terminates.

Back in step 1114, if the current packet is a new packet, then the state of this packet is set to Received (step 1140). The MaskVector for each Missing packet in the window is then updated and checked, and packets may be flushed by the re-ordering entity to higher layers as a result, as described above for step 1120 (step 1142). The window is then moved forward by setting the leading edge of the window, or RxLeadWinEdge, to TSNr (step 1144). All Received packets outside the window are then delivered to higher layers (step 1146), the state of all packets outside the window is set to Expected (step 1148), and all delay timers that have been set for packets outside the window are stopped (step 1150). Received packets (if any) not currently stalled by a hole are delivered to higher layers (1152). This may be performed as described above for step 1124.

A determination is then made whether or not a hole exists just to the left of the current packet (step 1154). This determination can be made by checking whether the state of the packet with TSNr−1 is Expected. If the answer is no, then the process terminates. Otherwise, if there is a hole, then a delay timer is started for the last packet in the hole (i.e., with TSNr−1) (step 1156). Each Expected packet in this hole is then set to Missing, and the MaskVector for each such packet is initialized by setting the element corresponding to HARQ channel Hx to "0" and all other elements to "1" (step 1158). The process then terminates.

For the embodiment described above, one delay timer is used for all Missing packets in each original hole (i.e., a hole detected with a new packet that moves the window forward). This timer is associated with the last Missing packet in the hole but is applicable to (or referenced by) all of the Missing packets in the hole. In one implementation, a timer_over flag is used for each Missing packet to indicate whether or not its applicable delay timer (i.e., the first delay timer to the right of the packet) has expired. When the original hole is detected, the timer_over flag for each Missing packet in the hole may be reset to "0" to indicate that the applicable delay timer has not expired (step 1158). And when the delay timer expires, the timer_over flags for all Missing packets covered by this timer are set to "1", and MaskVectors of all these Missing packets are also modified, as described above, to removed HARQ channels that are not active at this time or used for another priority queue. This implementation is described in further detail below.

The MaskVectors for the Missing packets are updated/revised based on various events such as (1) whenever the HARQ entity indicates that a packet transaction on a given HARQ channel is completed, and (2) when each delay timer maintained for an associated Missing packet expires.

Figure 11C:
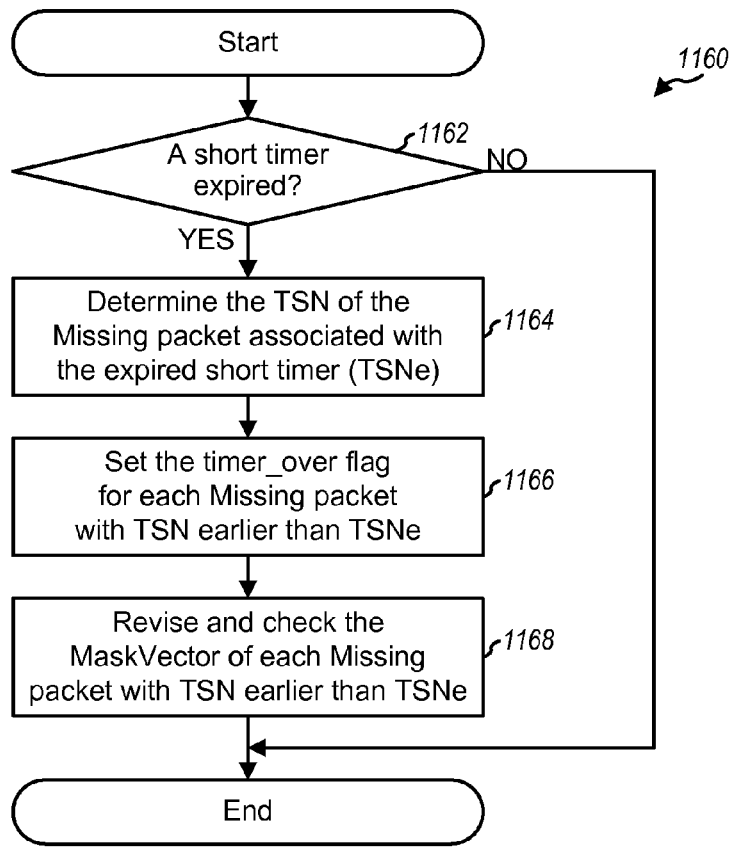
FIG. 11C shows a flow diagram of an embodiment of a process performed by the receiver reordering entity whenever an indication is received that a delay timer has expired.

FIG. 11C shows a flow diagram of an embodiment of a process 1160 performed by the receiver re-ordering entity whenever an indication is received that a delay timer has expired. Initially, a determination is made whether or not a delay timer has expired (step 1162). If the answer is no, then the process terminates. Otherwise, if a delay timer has expired, then the TSN of the Missing packet associated with the expired delay timer is determined and denoted as TSNe (step 1164). Multiple Missing packets may rely on this delay timer since only one is maintained for all missing packets in each original hole, as described above. The timer_over flag for each Missing packet covered by this expired delay timer is then set to "1" to indicate the timer for packet has expired (step 1166). The Missing packets covered by this expired delay timer include those with TSN earlier than TSNe. The MaskVector for each Missing packet covered by this delay timer is then "modified" (i.e., to revise the candidate set for the Missing packet) (step 1168). To modify the MaskVector for a Missing packet, each HARQ channel is considered, and if the channel is not Active or if the channel is used for another priority queue, then the corresponding element in the MaskVector is set to "0". The HARQ channels corresponding to the elements in the MaskVector that are still set to "1" are the remaining candidate HARQ channels at this time. If a MaskVector is revised, then it is checked to determine whether or not packets should be flushed to higher layers. The process then terminates.

Figure 11D:
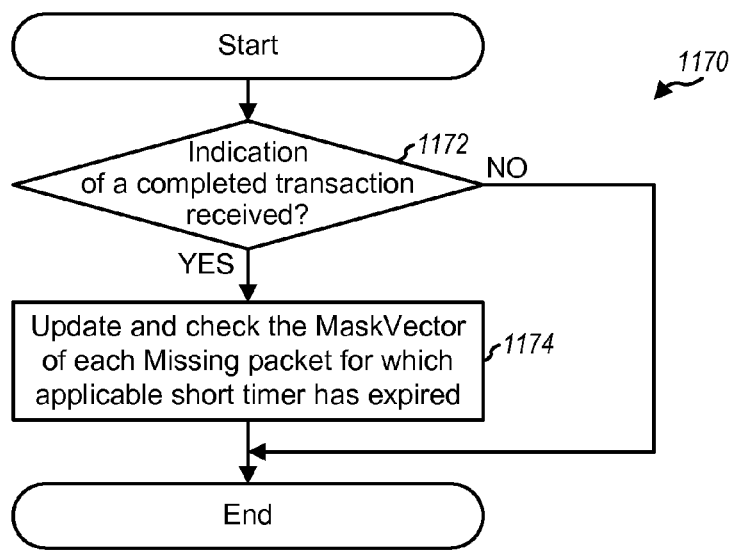
FIG. 11D shows a flow diagram of an embodiment of a process performed by the receiver reordering entity for a completed transaction on a particular HARQ channel.

FIG. 11D shows a flow diagram of an embodiment of a process 1170 performed by the receiver re-ordering entity for a completed transaction on a particular HARQ channel. Initially, determination is then made whether an indication has been received from the receiver HARQ entity that a packet transaction has been completed on an HARQ channel (step 1172). If the answer is yes, then for each Missing packet for which the applicable delay timer has expired (i.e., with the timer_over flag reset to "0"), the element in the MaskVector corresponding to the HARQ channel is set to "0" (step 1174). Again, if a MaskVector is updated, then it is checked to determine whether or not packets should be flushed to higher layers. The processing to be performed for a completed transaction on a HARQ channel is described in further detail in the pseudo-code below. The process then terminates.

In the embodiment described above, each receiver re-ordering entity is able to start multiple delay timers, one for each original hole detected within the window. In another embodiment, each re-ordering entity can have one delay timer running at any given moment. Whenever an original hole is detected, the delay timer for the re-ordering entity can be started if it is not currently running. If another original hole is subsequently detected while the delay timer is running, then no delay timer is started at that moment for the Missing packets in the second original hole. If the delay timer thereafter expires, then the Missing packets covered by this delay timer (i.e., the Missing packets with TSNs earlier than the TSNe of the Missing packet associated with the delay timer) are updated as shown in steps 1162 through 1166 in FIG. 11C. In addition (after step 1166), a determination is made whether or not there are any Missing packets with TSNs later than TSNe. If the answer is yes, then the delay timer is started again and associated with the latest Missing packet.

This alternative embodiment reduces the number of delay timers needed to be maintained by each re-ordering entity to one. However, this embodiment may double the delay timer value for a Missing packet in the worse case. For example, the delay timer may be started for a first Missing packet, and a second Missing packet may be detected in the next transmission interval. The delay timer for the second Missing packet cannot be started until the delay timer for the first Missing packet expires. The second Missing packet would then need to wait for the expiration of the delay timer for both the first Missing packet plus the second Missing packet. This alternative embodiment is described in further detail in the pseudo-codes shown below.

Figure 12:
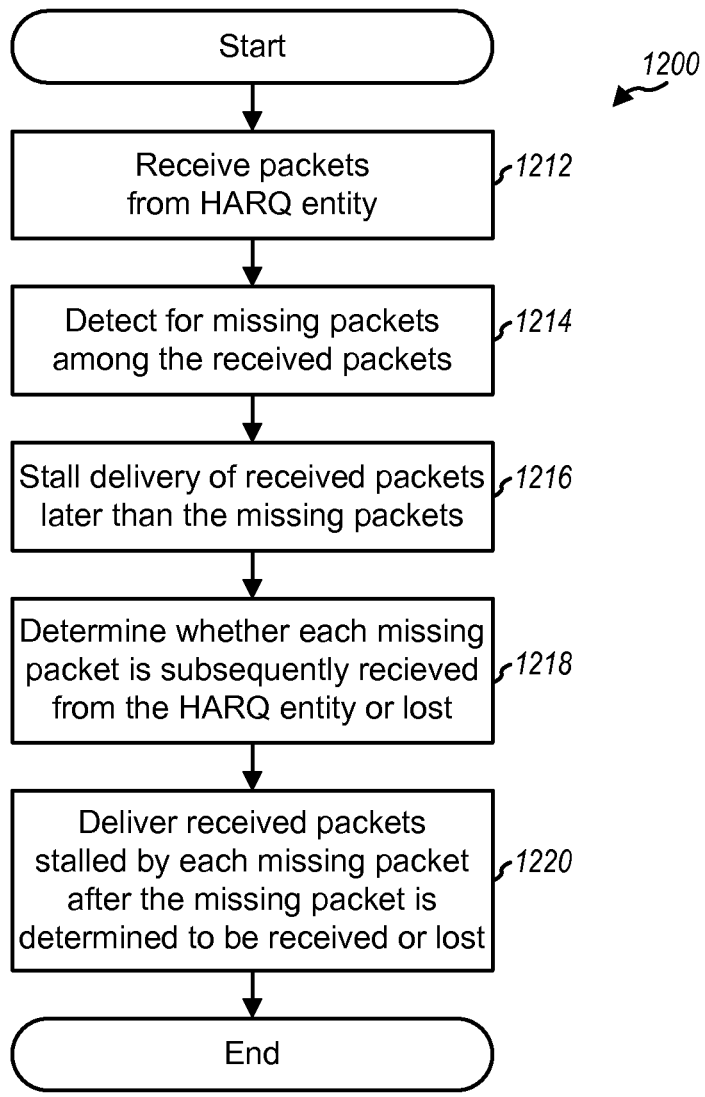
FIG. 12 shows a flow diagram of an overall process performed by the receiver re-ordering entity to receive packets from the HARQ entity and deliver packets to higher layers.

FIG. 12 shows a flow diagram of an overall process 1200 performed by a re-ordering entity to receive packets from the HARQ entity and deliver packets to higher layers. Initially, packets that have been decoded correctly are received from the HARQ entity (step 1212). Missing packets among the received packets are then detected (step 1214). This may be achieved based on the TSNs of the received packets as described above. If missing packets are detected, then delivery of received packets later than the detected missing packets to higher layers is stalled (step 1216). A determination is then made for each missing packet whether it is either (1) subsequently received from the HARQ entity or (2) lost, by successively eliminating HARQ channels that may be used to send the missing packet, as also described above (step 1218). Received packets that have been stalled by each missing packet are thereafter delivered to higher layers after the missing packet is determined to be lost or received from the HARQ entity (step 1220).

Pseudo-codes for a specific implementation of the processes described above in FIGS. 8 through 11C are shown below.

Transmitter HARQ Entity

When Scheduled for a (Re)Transmission for a Particular Priority Queue the Transmitter:
1—if this is the first transmission for the packet:
   2—toggle the New Data indicator;
1—set the QueueID field to the priority queue of the packet being transmitted;
1—end the procedure.
When Receiving an ACK:
1—discard the current packet being transmitted;
1—indicate to the scheduler that this HARQ entity is available;
1—end the procedure.

Receiver HARQ Entity

Upon Reception of a Control Channel Transmission Sent for the Receiver:
1—if the control message contains a flushing indication:
   2—handle the flushing indication for the priority queue indicated in the QueueID field (see below);
   2—end the procedure.
1—start/restart the inactivity timer (TM1) for the HARQ channel identified by the control message;
1—if the identified HARQ channel is in Inactive state:
   2—if CurrNewData has the same value as the New Data indicator:
     3—discard the received packet;
     3—send an ACK on the uplink;
     3—end the procedure.
   2—else:
     3—set the HARQ channel to Active state;
     3—set CurrNewData to the value of the New Data indicator;
     3—set CurrQueueID to the value of the Queue ID field;
     3—store the received packet transmission in a soft buffer;
1—else (if the HARQ channel is in Active state):
   2—if CurrNewData=New Data indicator:
     3—soft combine the received packet with the accumulated prior transmissions in the soft buffer;
   2—else:
     3—discard the data currently in the soft buffer;
     3—indicate to the re-ordering entity corresponding to CurrQueueID that the packet transaction is completed (see below);
     3—set CurrNewData to the value of the New Data indicator;
     3—set CurrQueueID to the value of the Queue ID field;
     3—store the received packet transmission in the soft buffer;
1—attempt to decode the packet in the soft buffer;
1—if the decoding is successful:
   2—send an ACK on the uplink;
   2—set the HARQ channel to Inactive state;
   2—deliver the recovered packet to the re-ordering entity corresponding to CurrQueueID (see below);
1—else:
   2—send a NAK on the uplink;
1—end the procedure.
Upon Expiration of Inactivity Timer (TM1) for a Given HARQ Channel:
1—discard the data currently in the soft buffer;
1—indicate to the re-ordering entity corresponding to CurrQueueID that the packet transaction is over (see below);
1—set the HARQ channel to Inactive state;
1—end the procedure.
Upon Reception of a Flushing Indication for a Given Priority Queue:
1—for each HARQ channel with CurrQueueID equal to the Queue ID value in the control message for the flushing indication:
   2—do not attempt to receive data;
   2—discard the data in the soft buffer;
   2—set the HARQ channel to Inactive state;
   2—indicate to the re-ordering entity corresponding to CurrQueueID that the packet transaction is over;
1—end the procedure.

Transmitter Re-Ordering Entity

When the Associated Priority Queue is Scheduled for Transmission, the Transmitter Re-Ordering Entity:
1—increment TxLeadWinEdge;
1—set the TSN for the new packet to TxLeadWinEdge;
1—discard any pending packets with TSN≤TxLeadWinEdge−WindowSize;
1—submit the new packet to the HARQ entity designated by the scheduler;
1—end the procedure.

Receiver Re-Ordering Entity

For the Embodiment Wherein One Delay Timer is Maintained for Each Original Hole.
When a New Packet with TSNr is Delivered by the HARQ Entity, the Receiver Re-Ordering Entity:

---

1- if the received packet is within the receiving window (RxLeadWinEdge − WindowSize ≤ TSNr < RxLeadWinEdge):
   2- for each TSNi in state Missing:
     3- if TSNi < TSNr:
       4- set the element in MaskVector corresponding to this HARQ channel to "0";

-continued

```
        4- if all the elements in MaskVector are equal to 0:
            5- perform flushing procedure (see below) for TSNi
    2- if the state of TSNr is Received or Delivered:
        3- discard the received packet;
    2- else (the state for TNSr is Missing):
        3- if the state of all packets within the receiving window
            with TSN < TSNr is Delivered then:
            4- if a delay timer (TM2) associated with TSNr is
                started then stop the timer;
            4- deliver the packet to higher layers;
            4- set the state of TSNr to Delivered;
            4- for each TSNj inside the receiving window, starting
                with TSNr + 1:
                5- if the state of TSNj is Expected or Missing:
                    6- stop iterating over TSNj.
                5- else, if the state of TSNj is Received:
                    6- deliver the data for TSNj to higher layer;
                    6- set the state of TSNj to Delivered;
                    6- if a delay timer is associated with TSNj,
                        then stop the timer;
                    6- go to next TSNj;
        3- else:
            4- set the state of TSNr to Received;
1- else (received packet is outside the receiving window):
    2- for each TSNi in state Missing:
        3- set the element in MaskVector corresponding to this
            HARQ channel to "0";
        3- if all the elements in MaskVector are equal to "0":
            4- perform flushing procedure for TSNi
    2- set RxLeadWinEdge to TSNr;
    2- deliver to higher layers all the data associated with TSNs
        outside the receiver window with state Received;
    2- stop all delay timer TM2 associated with TSNs outside the
        receiver window;
    2- set the state for all TSNs outside the receiver window to
        Expected;
    2- if the state of all packets within the receiving window
        with TSN < TSNr is Received or Delivered then:
        3- deliver the packets to higher layers;
        3- set the state of TSNr to Delivered;
    2- else:
        3- set the state of TSNr to Received;
        3- start a delay timer TM2 associated with TSNr-1;
        3- for each TSNj inside the receiving window with TSNj <
            TSNr with state Expected:
            4- set the state of TSNj to Missing;
            4- reset the timer_over flag to "0";
            4- in the MaskVector associated with TSNj:
                5- set the element corresponding to this HARQ
                    channel to "0";
                5- set the elements corresponding to other HARQ
                    channels to "1";
1- end the procedure;
```

When the HARQ Entity Indicates that a Packet Transaction is Over for a Particular HARQ Channel:

1—for each TSNi in state Missing for which the timer_over flag is set to 1:
   2—set the element in MaskVector corresponding to this HARQ channel to "0";
   2—if all the elements in MaskVector are equal to "0":
      3—perform flushing procedure for TSNi
1—end the procedure When a Delay Timer (TM2) Expires:

1—consider each TSN in state Missing, with TSN<=to the TSN associated with the timer:
   2—set the timer_over flag to "1";
   2—consider the MaskVector variable for this TSN;
   2—for each HARQ entity:
      3—if the HARQ entity is not in Active state or CurrQueueID is different from the priority queue of this re-ordering entity:
         4—set the element of the MaskVector corresponding to this HARQ channel to "0";
1—end the procedure;

Flushing Procedure—when all the Elements in MaskVector for TSNi are Equal to "0":

1—for each TSNj within the receiving window and earlier than or equal to TSNi:
   2—if the state of TSNj is Received then deliver the associated data to higher layer;
   2—set the state of TSNj to Delivered;
1—for each TSNj inside the receiving window, starting with TSNi+1:
   2—if the state of TSNj is Expected or Missing:
      3—stop iterating over TSNj.
   2—else, if the state of TSNj is Received:
      3—deliver the associated data to higher layer;
      3—set the state of TSNj to Delivered;
      3—go to next TSNj;
1—return;

For the Embodiment Wherein One Delay Timer is Maintained for Each Re-Ordering Entity.

When a New Packet with TSNr is Delivered by the HARQ Entity, the Receiver Re-Ordering Entity:

```
1- if the received packet is within the receiving window
    (RxLeadWinEdge - WindowSize ≤ TSNr < RxLeadWinEdge):
    2- for each TSNi in state Missing:
        3- if TSNi < TSNr:
            4- set the element in MaskVector corresponding to this
                HARQ channel to "0";
            4- if all the elements in MaskVector are equal to 0:
                5- perform flushing procedure (see below) for TSNi
    2- if the state of TSNr is Received or Delivered:
        3- discard the received packet;
    2- else (the state for TNSr is Missing):
        3- if the state of all packets within the receiving window
            with TSN < TSNr is Delivered then:
            4- if a delay timer (TM2) associated with TSNr is
                started then stop the timer;
            4- deliver the packet to higher layers;
            4- set the state of TSNr to Delivered;
            4- for each TSNj inside the receiving window, starting
                with TSNr + 1:
                5- if the state of TSNj is Expected or Missing:
                    6- stop iterating over TSNj.
                5- else, if the state of TSNj is Received:
                    6- deliver the data for TSNj to higher layer;
                    6- set the state of TSNj to Delivered;
                    6- if a delay timer is associated with TSNj,
                        then stop the timer;
                    6- go to next TSNj;
        3- else:
            4- set the state of TSNr to Received;
1- else (received packet is outside the receiving window):
    2- for each TSNi in state Missing:
        3- set the element in MaskVector corresponding to this
            HARQ channel to "0";
        3- if all the elements in MaskVector are equal to "0":
            4- perform flushing procedure for TSNi
    2- set RxLeadWinEdge to TSNr;
    2- deliver to higher layers all the data associated with TSNs
        outside the receiver window with state Received;
    2- stop all delay timer TM2 associated with TSNs outside the
        receiver window;
    2- set the state for all TSNs outside the receiver window to
        Expected;
    2- if the state of all packets within the receiving window
        with TSN < TSNr is Received or Delivered then:
        3- deliver the packets to higher layers;
        3- set the state of TSNr to Delivered;
    2- else:
        3- set the state of TSNr to Received;
        3- if the delay timer TM2 for this re-ordering entity is
            not running, then:
            4- start a delay timer TM2 associated with TSNr-1;
```

3- for each TSNj inside the receiving window with TSNj <
  TSNr with state Expected:
  4- set the state of TSNj to Missing;
  4- reset the timer_over flag to "0";
  4- in the MaskVector associated with TSNj:
    5- set the element corresponding to this HARQ
      channel to "0";
    5- set the elements corresponding to other HARQ
      channels to "1";
1- end the procedure;

When the HARQ Entity Indicates that a Packet Transaction is Over for a Particular HARQ Channel:
1—for each TSNi in state Missing for which the timer_over flag is set to 1:
  2—set the element in MaskVector corresponding to this HARQ channel to "0";
  2—if all the elements in MaskVector are equal to "0":
    3—perform flushing procedure for TSNi
1—end the procedure
When a Delay Timer (TM2) Expires:
1—consider each TSN in state Missing, with TSN<=to the TSN associated with the timer:
  2—set the timer_over flag to "1";
  2—consider the MaskVector variable for this TSN;
  2—for each HARQ entity:
    3—if the HARQ entity is not in Active state or Curr-QueueID is different from the priority queue of this re-ordering entity:
      4—set the element of the MaskVector corresponding to this HARQ channel to "0";
1—if there is any TSN in state Missing:
  2—start the delay timer and associated it with the TSN of the latest packet in state Missing;
1—end the procedure;
Flushing Procedure—when all the Elements in MaskVector for TSNi are Equal to "0":
1—for each TSNj within the receiving window and earlier than or equal to TSNi:
  2—if the state of TSNj is Received then deliver the associated data to higher layer;
  2—set the state of TSNj to Delivered;
1—for each TSNj inside the receiving window, starting with TSNi+1:
  2—if the state of TSNj is Expected or Missing:
    3—stop iterating over TSNj.
  2—else, if the state of TSNj is Received:
    3—deliver the associated data to higher layer;
    3—set the state of TSNj to Delivered;
    3—go to next TSNj;
1—return;

The pseudo-code for a specific implementation is shown above to provide a clearer understanding of the processing performed by various entities at the transmitter and receiver. Other implementations may also be contemplated, as would be recognized by one skilled in the art based on the teachings described herein, and these various other implementations are also within the scope of the invention.

The techniques described herein may be used to provide improved stall avoidance performance for systems having an underlying retransmission mechanism (e.g., HARQ) and higher layers that require data in sequential order. These techniques may be used for various communication systems such as, for example, W-CDMA systems, cdma2000 systems, and so on. These techniques may also be used for other types of communication systems (e.g., TDMA and FDMA systems).

Figure 13:
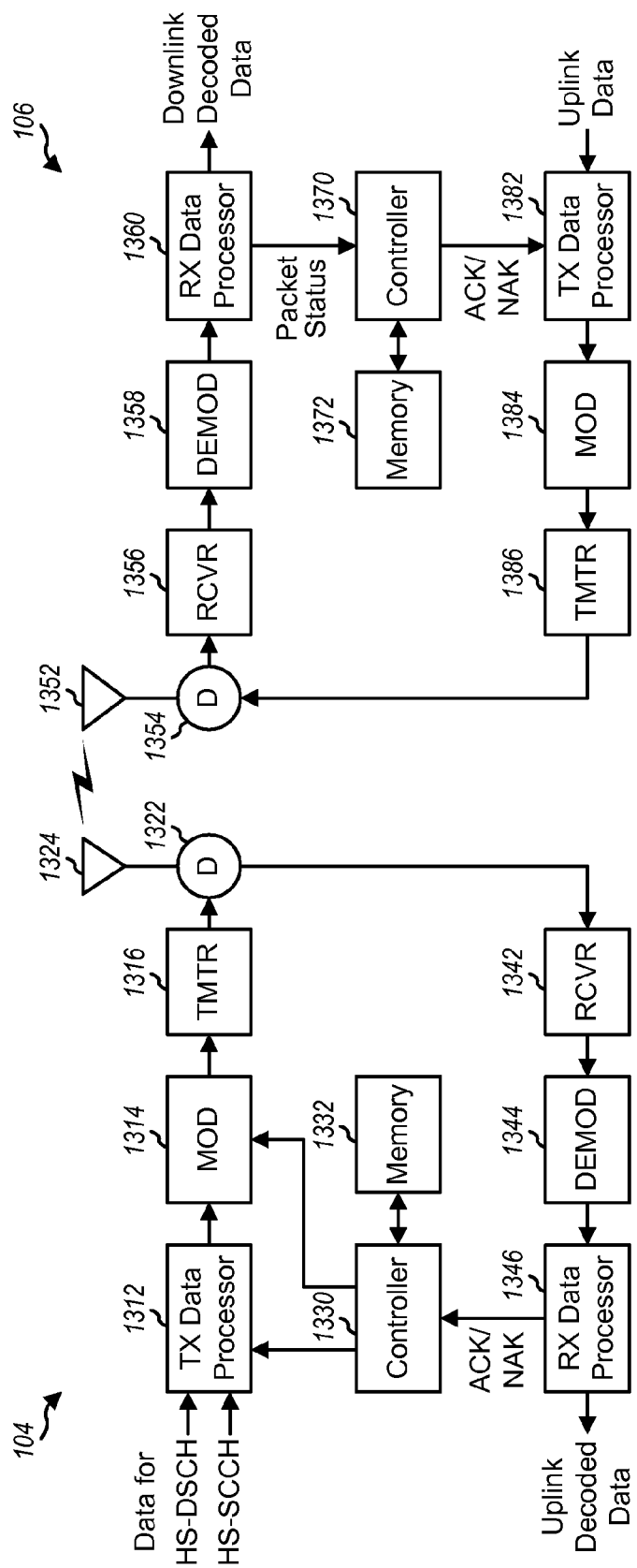
FIG. 13 is a block diagram of an embodiment of a Node B and a UE.

FIG. 13 is a block diagram of an embodiment of Node B 104 and UE 106. On the downlink, data for the HS-DSCH and HS-SCCH for a particular UE designated to receive HSDPA transmission is received and processed (e.g., formatted, encoded, and so on) by a transmit (TX) data processor 1312. The processing for the HS-DSCH and HS-SCCH may be performed as described in the applicable standard documents for W-CDMA Release 5, including TS.25-321 V5.0.0, TS.25-308 V5.2.0, and 25-212 V5.0.0, which are all incorporated herein by reference. These and other documents for W-CDMA Release 5 are publicly available.

The processed data is then provided to a modulator (MOD) 1314 and further processed (e.g., channelized, spread, and so on) to provide modulated data. A transmitter (TMTR) unit 1316 then converts the modulated data into one or more analog signals, which are further conditioned (e.g., amplified, filtered, and frequency upconverted) to provide a downlink signal. The downlink signal is routed through a duplexer (D) 1322 and transmitted via an antenna 1324 to the designated UE.

At the UE, the downlink signal is received by an antenna 1352, routed through a duplexer 1354, and provided to a receiver (RCVR) unit 1356. Receiver unit 1356 conditions (e.g., filters, amplifies, and frequency downconverts) the received signal and further digitizes the conditioned signal to provide samples. A demodulator 1358 then receives and processes (e.g., despreads, channelizes, and data demodulates) the samples to provide symbols. Demodulator 1358 may implement a rake receiver that can process multiple instances (or multipath components) of the received signal to provide combined symbols. A receive (RX) data processor 1360 then decodes the symbols, checks the received packets, and provides the decoded data. The processing by demodulator 1358 and RX data processor 1360 is complementary to the processing by modulator 1314 and TX data processor 1312, respectively.

In one embodiment, RX data processor 1360 performs the processing for the physical layer and part of the MAC layer (e.g., the HARQ entity), and a controller 1370 performs some of the processing for the MAC layer (e.g., the re-ordering entity) and further implements part of HARQ. For this embodiment, RX data processor 1360 may provide (1) the decoded data for each packet decoded correctly, (2) the status of each packet transmission (e.g., ACK or NAK), (3) indications of expired inactivity and delay timers, and so on. Controller 1370 may then detect for missing packets and provide packets to higher layers as they are received and available. Controller 1370 further provides to a TX data processor 1382 the appropriate ACK/NAK feedback for the HARQ operation.

On the uplink, data for the uplink and ACK/NAK feedback information are processed (e.g., formatted, encoded, and so on) by TX data processor 1382, further processed (e.g., channelized, spread, and so on) by modulator 1384, and conditioned (e.g., converted to analog signals, amplified, filtered, and frequency upconverted) by a transmitter unit 1386 to provide an uplink signal. The uplink signal is then routed through duplexer 1354 and transmitted via antenna 1352 to the base station.

At the Node B, the uplink signal is received by antenna 1324, routed through duplexer 1322, and provided to a receiver unit 1342. Receiver unit 1342 conditions (e.g., frequency downconverts, filters, and amplifies) the received signal and further digitizes the conditioned signal to provide a stream of samples. A demodulator 1344 then processes (e.g., despreads, channelizes, and so on) the samples to provide symbols, and an RX data processor 1346 further processes the symbols to provide the decoded data for the UE. The data processing for the downlink and uplink is described by the W-CDMA standard documents.

A controller 1330 receives the ACK/NAK feedback from RX data processor 1346 and directs the retransmission of packets for HARQ, as necessary. Controllers 1330 and 1370 further control the processing at the Node B and the UE, respectively. Each controller may also be designed to implement all or a portion of the techniques described herein for HARQ transmission/retransmission. Program codes and data required by controllers 1330 and 1370 may be stored in memory units 1332 and 1372, respectively.

The techniques described herein for improving stall avoidance performance may be implemented by various means. For example, these techniques may be implemented in hardware, software, or a combination thereof. For a hardware implementation, the elements used to implement the techniques (e.g., the elements that perform the processes shown in FIGS. 8 through and 11A) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, these techniques may be implemented with modules (e.g., procedures, functions, and so on) that perform the functions described herein. The software codes may be stored in a memory unit (e.g., memory units 1332 and 1372 in FIG. 13) and executed by a processor (e.g., controllers 1330 and 1370). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of wireless communications comprising:
   determining a priority of a data packet to be transmitted;
   transmitting said data packet on a data channel;
   transmitting a transmission sequence number indicating an order of said data packet in a sequence of data packets;
   forming a control message having said priority included therein; and
   transmitting said control message on a control channel concurrently with said data channel.

2. The method of claim 1, wherein said priority corresponds to one of a plurality of priority queues and said control message comprises a Queue ID (QID) field identifying said one of the plurality of priority queues.

3. The method of claim 1, wherein said channels comprise a W-CDMA channel.

4. The method of claim 1, wherein said control message further comprises a flushing indication.

5. The method of claim 4, wherein said flushing indication comprises an indication to flush at least one data channel having a different priority than said priority of said data packet.

6. The method of claim 5, wherein said flushing indication comprises an indication to flush said at least one data channel to a higher protocol layer.

7. The method of claim 1, wherein said data channel comprises a hybrid automatic retransmission channel.

8. The method of claim 1, wherein said transmission sequence number is transmitted on said data channel.

9. The method of claim 1, wherein data packets in said sequence of data packets have the same priority.

10. The method of claim 1, wherein said priority corresponds to one of a plurality of re-ordering buffers at a receiver and said transmission sequence number corresponds to an order of said data packet within said one of the plurality of re-order buffers.

11. An apparatus comprising:
    a controller configured to determine a priority of a data packet to be transmitted, transmit said data packet on a data channel, transmit a transmission sequence number indicating an order of said data packet in a sequence of data packets, form a control message having said priority included therein, and transmit said control message on a control channel concurrently with said data channel.

12. The apparatus of claim 11, wherein said priority corresponds to one of a plurality of priority queues and said control message comprises a Queue ID (QID) field identifying said one of the plurality of priority queues.

13. The apparatus of claim 11, wherein said channels comprise a W-CDMA channel.

14. The apparatus of claim 11, wherein said control message further comprises a flushing indication.

15. The apparatus of claim 14, wherein said flushing indication comprises an indication to flush at least one data channel having a different priority than said priority of said data packet.

16. The apparatus of claim 11, wherein said data channel comprises a hybrid automatic retransmission channel.

17. An access terminal, comprising:
    a screen for displaying information based on data from a data channel;
    one or more input keys configured to display said information; and
    a controller configured to determine a priority of a data packet to be transmitted, transmit said data packet on said data channel, transmit a transmission sequence number indicating an order of said data packet in a sequence of data packets, form a control message having said priority included therein, and transmit said control message on a control channel concurrently with said data channel.

18. An access point, comprising:
    an antenna;
    a transmitter configured to transmit data packets via said antenna; and
    a controller configured to determine a priority of a data packet to be transmitted, transmit said data packet on a data channel, transmit a transmission sequence number indicating an order of said data packet in a sequence of data packets, form a control message having said priority included therein, and transmit said control message using said transmitter on a control channel concurrently with said data channel.

19. A non-transitory machine-readable medium comprising instructions executable by a machine for receiving data, the instructions configured when executed to cause the machine to:
- determine a priority of a data packet to be transmitted;
- transmit said data packet on a data channel;
- transmit a transmission sequence number indicating an order of said data packet in a sequence of data packets;
- form a control message having said priority included therein; and
- transmit said control message on a control channel concurrently with said data channel.

* * * * *